United States Patent
Suzuki

(10) Patent No.: US 12,084,740 B2
(45) Date of Patent: *Sep. 10, 2024

(54) STEEL SHEET

(71) Applicant: NIPPON STEEL CORPORATION, Tokyo (JP)

(72) Inventor: Yuya Suzuki, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 524 days.

This patent is subject to a terminal disclaimer.

(21) Appl. No.: 17/432,330

(22) PCT Filed: Apr. 24, 2020

(86) PCT No.: PCT/JP2020/017825
§ 371 (c)(1),
(2) Date: Aug. 19, 2021

(87) PCT Pub. No.: WO2020/218572
PCT Pub. Date: Oct. 29, 2020

(65) Prior Publication Data
US 2022/0170127 A1 Jun. 2, 2022

(30) Foreign Application Priority Data
Apr. 24, 2019 (JP) ................. 2019-083400

(51) Int. Cl.
*C21D 9/46* (2006.01)
*C21D 8/02* (2006.01)
(Continued)

(52) U.S. Cl.
CPC ............. *C21D 9/46* (2013.01); *C21D 8/0226* (2013.01); *C21D 8/0236* (2013.01);
(Continued)

(58) Field of Classification Search
None
See application file for complete search history.

(56) References Cited

U.S. PATENT DOCUMENTS

2014/0234660 A1 8/2014 Kawata et al.
2017/0183751 A1 6/2017 Tsunezawa et al.
(Continued)

FOREIGN PATENT DOCUMENTS

CA 2 850 340 C 10/2016
JP 2011111673 A * 6/2011
(Continued)

OTHER PUBLICATIONS

Machine Translation of JP-2011111673-A (Year: 2011).*
Machine Translation of WO-2013190975-A1 (Year: 2013).*

*Primary Examiner* — Keith Walker
*Assistant Examiner* — Ryan L Heckman
(74) *Attorney, Agent, or Firm* — Birch, Stewart, Kolasch & Birch, LLP

(57) ABSTRACT

The present invention relates to steel sheet realizing both formability and weldability. The steel sheet of the present invention is characterized in that at a surface layer part of a region down to 30 μm from the surface of the steel sheet in the sheet thickness direction, Al oxide grains are present in 3000 to 6000/mm² in number density, the natural logarithms of the particle sizes of the Al oxide grains measured in μm units are on the average −5.0 to −3.5, the standard error is 0.6 or less, and the number of Al oxide grains with deviations of the natural logarithms of the particle sizes from the average larger than 2 times the standard error is 5% or less of the total number of Al oxide grains and at a position of ½ of the thickness of the steel sheet, the number density of the Al oxide grains is 1000/mm² or less.

4 Claims, 1 Drawing Sheet

(51) Int. Cl.
| | |
|---|---|
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/54* | (2006.01) |
| *C22C 38/60* | (2006.01) |
| *C23C 2/28* | (2006.01) |
| *C23C 2/40* | (2006.01) |

(52) U.S. Cl.
CPC .......... *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/60* (2013.01); *C23C 2/28* (2013.01); *C23C 2/40* (2013.01); *C21D 2211/001* (2013.01)

(56) References Cited

U.S. PATENT DOCUMENTS

| | | | |
|---|---|---|---|
| 2019/0017156 A1* | 1/2019 | Kawamura | ........... C22C 38/008 |
| 2019/0218640 A1 | 7/2019 | Kakiuchi et al. | |
| 2020/0325554 A1 | 10/2020 | Takeda et al. | |

FOREIGN PATENT DOCUMENTS

| | | | | |
|---|---|---|---|---|
| JP | 5488410 B2 | 5/2014 | | |
| JP | 6388099 B1 | 9/2018 | | |
| WO | WO-2013190975 A1 * | 12/2013 | ........... C22C 38/001 |
| WO | WO 2018/025674 A1 | 2/2018 | | |

* cited by examiner

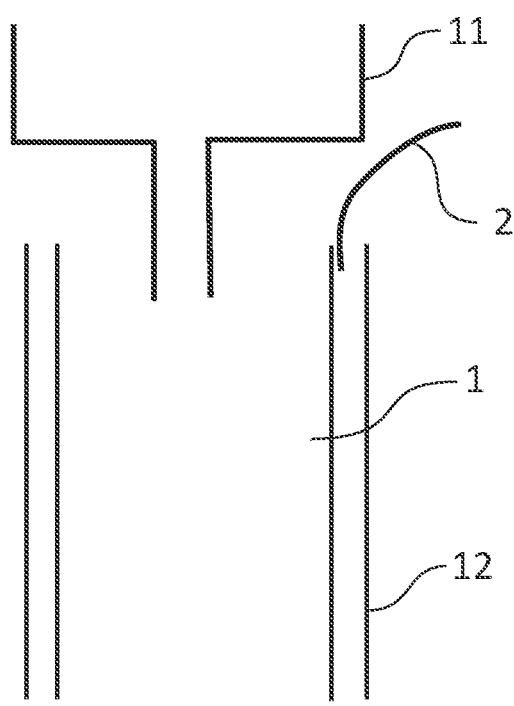

STEEL SHEET

FIELD

The present invention relates to steel sheet.

BACKGROUND

In recent years, from the viewpoint of improvement of the fuel efficiency etc. of automobiles for the purpose of environmental conservation, steel sheet for automobile use is being made higher in strength and thinner in thickness so as to lighten the weight of automobiles. Further, the steel sheet used for auto parts is formed into various shapes, so excellent formability is demanded. Furthermore, in the process of assembly of automobiles, the shaped parts are welded together, so good weldability is also important as a criteria for selection of the steel sheet used for the structural parts of automobiles.

In this regard, in welding steel sheet, for example, as described in the following PTL 1, sometimes the drop in strength of welded joint becomes a problem. If the toughness of the nuggets formed at the time of welding is low, cracking is believed to occur and advance in the nuggets and strength of the welded joint to fall.

CITATIONS LIST

Patent Literature

[PTL 1] Japanese Patent No. 6388099

SUMMARY

Technical Problem

Cracking in such nuggets occur and advance at the surface layer part of steel sheet. For this reason, the state of the surface part is believed to have a great effect on the weldability of the steel sheet. However, no prior art can be found improving the weldability of steel sheet by modification of the surface layer part. Therefore, the present invention has as its object the provision of steel sheet able to realize both formability and weldability.

Solution to Problem

The inventors studied modifying the surface layer of the steel sheet to keep the strength of a welded joint from falling due to the formation and advance of cracking inside the nuggets. As a result, the inventors thought that by raising the toughness of nuggets at the surface layer part of steel sheet, it is possible to keep strength of the welded joint from falling and improve the weldability.

First, the inventors prepared several steel sheets with large numbers of Al oxide grains distributed at the surface layer part and investigated the weldability of these steel sheets. As a result, these steel sheets were all improved in weldability. The mechanism of this effect is not completely clear, but is believed to be as follows:

Al oxide particles distributed at the surface layer part of steel sheet are believed to keep austenite from coarsening by becoming pinning particles at the time of welding. To keep austenite from coarsening, the prior austenite of the martensite formed by the cooling at the time of welding becomes finer in size. By the prior austenite of the martensite becoming finer in size, it is believed the toughness of the nuggets is improved. As a result, it is believed that the formation and advance of cracks inside the nuggets are suppressed and the weldability is improved.

However, it is known that depending on the distribution of Al oxide grains, the weldability will be improved while the formability will deteriorate. The inventors continued with more detailed investigation. As a result, the inventors discovered that suitably controlling the distribution of Al oxide grains at the surface layer part of steel sheet is important for preventing deterioration of the formability.

The gist of the present invention obtained in the above way is as follows:

(1) A steel sheet with a tensile strength of 780 MPa or more, a region down to 30 μm from a surface of the steel sheet in a sheet thickness direction being defined as a "surface layer part", at the surface layer part of at least one side, particle size 20 nm or more Al oxide grains being present in 3000 to 6000/mm$^2$ in number density, an average of natural logarithms of the particle sizes of the Al oxide grains measured in μm units being −5.0 to −3.5, a standard error of the natural logarithms of the particle sizes being 0.8 or less, a number of Al oxide grains with deviations of the natural logarithms of the particle sizes from the average larger than 2 times the standard error being 5% or less of the total number of Al oxide grains with particle sizes of 20 nm or more, a chemical composition at a position of ¼ of the thickness from the surface of the steel sheet comprising, by mass %, C: 0.050 to 0.800%, Si: 0.01 to 1.20%, Mn: 0.01 to 8.00%, P: 0.100% or less, S: 0.050% or less, Al: 0 to 3.000%, N: 0.010% or less, O: 0 to 0.020%, Cr: 0 to 3.00%, Mo: 0 to 1.00%, B: 0 to 0.0100%, Ti: 0 to 0.200%, Nb: 0 to 0.200%, V: 0 to 0.20%, Cu: 0 to 1.000%, Ni: 0 to 1.000%, and bal.: Fe and impurities, a number density of Al oxide grains at a position of ½ of the thickness of the steel sheet being 1000/mm$^2$ or less.

(2) The steel sheet according to (1) wherein the chemical composition further comprises at least one element selected from the group consisting of, by mass %, Cr: 0.01 to 3.00%, Mo: 0.01 to 1.00%, B: 0.001 to 0.0100%, Ti: 0.010 to 0.200%, Nb: 0.010 to 0.200%, V: 0.01 to 0.20%, Cu: 0.010 to 1.000%, and Ni: 0.010 to 1.000%.

(3) The steel sheet according to (1) or (2) wherein metallic structures at a position of ¼ of the thickness from the surface of the steel sheet include, by area ratio, retained austenite in 10% or more.

(4) The steel sheet according to any one of (1) to (3), wherein the steel sheet further comprises a hot dip galvanized layer, a hot dip galvannealed layer, or an electrogalvanized layer at the surface of the surface layer part.

Advantageous Effects of Invention

According to the present invention, it is possible to provide steel sheet able to realize both formability and weldability. Such steel sheet of the present invention is suitable as a material for auto parts etc.

BRIEF DESCRIPTION OF DRAWINGS

FIG. 1 is a schematic view showing one example of a method of adding iron oxide to a surface layer part of molten steel in a continuous casting process of a method for manufacturing steel sheet of the present invention.

DESCRIPTION OF EMBODIMENTS

Below, embodiments of the present invention will be explained. Note that, the embodiments shown below are for facilitating understanding of the present invention and must not be interpreted as limiting the present invention. The present invention can be changed and improved from the following embodiments without departing from the gist. Note that, the "to" in expressions of the numerical ranges means inclusion of the numerical value at the left side as the lower limit and the numerical value of the right side as the upper limit.

The tensile strength of the steel sheet according to the present embodiment is made 780 MPa or more, preferably is made 900 MPa or more. In the steel sheet according to the present embodiment, the region down to 30 μm from the surface of the steel sheet in the sheet thickness direction is defined as the surface layer part and the region at the inside from the surface layer part in the sheet thickness direction is defined as the center part of the steel sheet. The surface layer part of steel sheet according to the present embodiment satisfies the conditions explained below:

Al oxide grains are present at the surface layer part on at least one side of the steel sheet. The surface layer part may be formed at only one side of the steel sheet or may be formed at both sides of the steel sheet. In the present embodiment, the number density of the Al oxide grains is 3000 to 6000/mm². The particle sizes of the Al oxide grains in the present embodiment respectively fall in line with the following distribution of particle sizes. That is, the natural logarithms of the particle sizes of the Al oxide grains measured in μm units are on the average −5.0 to −3.5 and the standard error is 0.8 or less. Further, among the Al oxide grains, the number of ones with deviations of the natural logarithms of the particle sizes from the average of more than 2 times the standard error is 5% or less of the number of all Al oxide grains measured at the surface layer part. By satisfying the condition of the above Al oxides, it becomes possible to realize both formability and weldability of high strength steel sheet having a 780 MPa or more tensile strength.

Further, the standard error of the natural logarithms of the particle sizes of the Al oxide grains measured in μm units is −3.5 or less. Due to this, coarse Al oxide grains are kept from becoming starting points for cracking at the time of shaping of the steel sheet and the formability of the steel sheet is kept from deteriorating. From this viewpoint, this average is more preferably −3.6 or less, still more preferably −3.8 or less. Note that, in the present invention, the "formability" indicates the total elongation obtained by taking a Japan Industrial Standard JIS No. 5 test piece perpendicular to the rolling direction from the steel sheet and subjecting the test piece to a tensile test based on JIS Z 2241 (2011). On the other hand, by the average of the natural logarithms of the Al oxide grains measured in μm units being made −5.0 or more, the weldability of the steel sheet is improved. From this viewpoint, the average is preferably −4.9 or more, more preferably −4.7 or more.

Further, the standard error of the natural logarithms of the particle sizes of the Al oxide grains measured in μm units is 0.8 or less. Due to this, it is possible to keep coarse Al oxide grains from becoming starting points for cracking at the time of shaping of the steel sheet and keep the formability of the steel sheet from deteriorating. The lower limit of the standard error is ideally 0. Making the lower limit of the standard error less than 0.2 is difficult technically. For this reason, the lower limit of the standard error may be made 0.2.

Further, in the above particle size distribution, the ratio of the Al oxide grains with natural logarithms of the particle sizes more than 2 times the standard error from the average is 5% or less of the total Al oxide grains. By the particle sizes of the Al oxide grains being controlled in this way, it is possible to keep coarse Al oxide grains from becoming starting points for cracking at the time of shaping of the steel sheet and keep the formability of the steel sheet from deteriorating. The lower limit of the ratio is ideally 0. Making the above ratio less than 1% is difficult technically, so the lower limit may be made 1%.

The number density of the large number of Al oxide grains present at the surface layer part of at least one side of the steel sheet is 3000 to 6000/mm². By making the number density of Al oxide grains present at the surface layer part of the steel sheet 3000/mm² or more, the toughness of the nuggets is improved, strength of the welded joint is kept from falling, and the weldability can be improved. On the other hand, by making the number density of Al oxide grains present at the surface layer part of the steel sheet 6000/mm² or less, the formability of the steel sheet is kept from deteriorating. From this viewpoint, the number density of the Al oxide grains is more preferably 5500/mm² or less, still more preferably 5000/mm² or less.

Al oxide grains may be present beyond the surface layer part of the range down to 30 μm from the surface. If a large number of Al oxide grains are present at both sides of the steel sheet, the respective surface layer parts may be formed under similar conditions or the respective surface layer parts may be formed under mutually different conditions. At that time, if one of the surface layer parts satisfies the above conditions, the other of the surface layer parts need not satisfy the above conditions, but preferably both of the surface layer parts satisfy the above conditions. If making the surface layer part satisfying the above conditions the joined surface, it is possible to raise the toughness of the nuggets and secure the strength of the welded joint.

In the present invention, "the number density of Al oxide grains at the surface layer part" and "the particle size distribution of Al oxide grains at the surface layer part" are determined in the following way.

The number and particle sizes of the Al oxide grains can be identified by examination of a cross-section parallel to the rolling direction of the steel sheet and the sheet thickness direction by a power of 10000×. Specifically, first, the cross-section of the cutout steel sheet is finished to a mirror surface by mechanical polishing, then a Nital etchant is used to bring out the steel structures. After that, the steel structures are examined using a scanning electron microscope (SEM) at a 0.04 mm² region (region included in surface layer part) centered about a position of 15 μm from the surface of the steel sheet in the sheet thickness direction (position of ½ of thickness of the surface layer part). The value of the thus observed and counted number of Al oxide grains converted to the number per mm² is made the "number density of Al oxide grains of the surface layer part". Further, the particle sizes of Al oxide grains obtained by measurement in that region (circumscribing circle equivalent diameter) and the frequency at which the values of the particle sizes are measured are made the "particle size distribution of Al oxide grains of the surface layer part". Here, the Al oxide grains included in the above number of Al oxide grains are made ones with particle sizes of 20 nm or more.

The mechanism of this effect is not completely clear, but is believed to be as follows: If the particle sizes of the Al oxide grains present at the surface layer part do not fall in line with the above particle size distribution, there may tend to be many coarse Al oxide grains present at the surface layer part. These coarse Al oxide grains become causes of concentration of strain and stress at the time of shaping the steel sheet and may become starting points for cracking by formation of voids. On the other hand, by the particle sizes of the large number of Al oxide grains distributed at the surface layer part falling in line with the above particle size distribution, in this way, austenite coarsening can be promoted while cracking due to coarse Al oxide grains can be kept from occurring. For this reason, it is believed the formability of the steel sheet can be kept from deteriorating while the weldability can be improved.

Note that, no notable effect on the weldability of steel sheet could be recognized due to the number density or particle sizes of Al oxide grains at portions other than the surface layer part of the steel sheet. From this, even if using sheets which had been considered disadvantageous for weldability in the past such as the excellent ductility DP (dual phase) steel or TRIP (transformation induced plasticity) steel for the center part of the steel sheet, it is possible to obtain steel sheet excellent in weldability by forming the surface layer part in the above way. This point is one of the superior points of the present invention.

However, from the viewpoint of suppressing deterioration of the formability of steel sheet, the number density of the Al oxide grains present at the center part of the steel sheet is preferably small. Specifically, the number density of Al oxide grains at the center of the steel sheet in the sheet thickness direction (position of ½ of the thickness) is made $1000/mm^2$ or less. In this region, the region of $0.04\ mm^2$ centered at the position of ½ of the thickness is examined for steel structures by a power of 10000× in the same way as above. The value of the number of Al oxide grains counted by observation in this way converted to the number per $mm^2$ is made the number density of the Al oxide grains at the center part of the steel sheet.

Further, to further improve the formability in the steel sheet of the present embodiment, the center part of the steel sheet preferably includes retained austenite in an area ratio of 10% or more. Specifically, the metallic structures at the position of ¼ of the thickness from the surface of the steel sheet preferably include an area ratio of retained austenite of 10% or more. Since the ductility is improved by the transformation induced plasticity of the retained austenite, the area ratio of the retained austenite is made 10% or more, whereby the total elongation of the steel sheet can be made 15% or more. If using the effect of the retained austenite, even if soft ferrite is sometimes not included, a 15% or more total elongation can be secured. For this reason, it is possible to make the center part of the steel sheet high strength and realize both higher strength of the steel sheet and improvement of the formability of the steel sheet.

In the present invention, the volume ratio of the retained austenite found in the following way is deemed the area ratio of the retained austenite of the center part of the steel sheet. The volume ratio of retained austenite can be found by X-ray diffraction. First, a sample having a cross-section of thickness parallel to the rolling direction of the steel sheet is taken. In this sample, the thickness from surface of the steel sheet down to a position of ¼ of the thickness is removed by mechanical polishing and chemical polishing to expose the surface of the position of ¼ of the thickness from the surface of the steel sheet. Further, the thus exposed surface is irradiated by MoKα rays to find the integrated intensity ratio of the diffraction peaks of the (200) plane and (211) plane of the bcc phase and the (200) plane, (220) plane, and (311) plane of the fcc phase. From this integrated intensity ratio of the diffraction peaks, it is possible to calculate the volume ratio of the retained austenite. As the method of calculation, the general five-peak method can be used.

Next, the chemical composition of the steel sheet of the present invention will be explained. In the steel sheet of the present invention, the chemical composition at the center part of the steel sheet preferably satisfies the following conditions. The chemical composition of the center part of the steel sheet shall mean the chemical composition measured the position of ¼ of the thickness from the surface of the steel sheet. The "%" regarding the content of elements mean "mass %" unless otherwise indicated.

"C: 0.050 to 0.800%"

C is an element raising the strength of steel sheet. To obtain the effect of sufficiently raising the strength of steel sheet, the content of C is made 0.050% or more. Further, by the content of C being 0.800% or less, the toughness of the steel sheet can be kept from dropping. From this viewpoint, the content of C is preferably 0.600% or less, more preferably is 0.500% or less.

"Si: 0.01 to 1.20%"

Si is an element stabilizing the ferrite. That is, Si increases the Ac3 transformation point, so it is possible to form a large amount of ferrite in a broad range of annealing temperatures. This is added from the viewpoint of improvement of the controllability of the structures of the steel. To obtain such an effect by Si, the content of Si is made 0.01% or more. In addition, Si is an element suppressing the coarsening of iron-based carbides and raising the strength and formability of steel sheet. Further, Si is added as a solution strengthening element for contributing to higher strength of steel sheet. From these viewpoints, the content of Si is more preferably 0.2% or more, still more preferably 0.5% or more. From the viewpoint of keeping the steel sheet from becoming brittle and the formability from deteriorating, the content of Si is made 1.20% or less. The content of Si is preferably 1.00% or less.

"Mn: 0.01 to 8.00%"

Mn is an element raising the hardenability of steel. To obtain such an effect by Mn, the content of Mn is made 0.01% or more. From the viewpoint of keeping Mn from segregating and the difference in hardness from becoming too great, the content of Mn is made 8.00% or less. The content of Mn is preferably 5.00% or less, more preferably 4.00% or less, still more preferably 3.00% or less.

"P: 0.100% or Less"

P is an element sometimes segregating and causing embrittlement of the weld zone. For this reason, the content of P is preferably small. Specifically, the content of P is made 0.100% or less. The lower limit of the content of P is 0. Making the content of P less than 0.001% is economically disadvantageous, so 0.001% may be made the lower limit.

"S: 0.050% or Less"

S is an element sometimes having a detrimental effect on the weldability of steel sheet and the manufacturability at the time of casting and the time of hot rolling. For this reason, the content of S is preferably small. Specifically, the content of S is made 0.050% or less. The lower limit of the content of S is 0. Making the content of S less than 0.001% is economically disadvantageous, so 0.001% may be made the lower limit.

"Al: 0 to 3.000%"

Al is an element acting as a deoxidizer and is added in the deoxidation process according to need. If using Al as a deoxidizer, 0.050% or less of Al may be contained in the steel sheet. As explained later, when manufacturing hot rolled steel sheet of the present invention by stacking and joining different steel sheets, if the surface layer contains predetermined Al oxides, there is no need for Al to be contained at a position of ¼ of the thickness from the surface of the steel sheet. The amount of Al may also be 0. Further, as explained later, if supplying oxygen to the surface layer of the slab to form Al oxide particles at the surface layer part of the steel sheet, it is necessary that Al be supplied from the slab, so the slab preferably contains Al in 0.010% or more, more preferably 0.100% or more, still more preferably 0.300% or more or 0.800% or more. In this case, the content of Al at a position of ¼ of the thickness from the surface of the steel sheet may be 0.500% or more or 0.800% or more in accordance with the amount of Al contained in the slab. On the other hand, from the viewpoint of suppressing slab cracking at the time of continuous casting, the content of Al is preferably made 3.000% or less.

"N: 0.010% or Less"

N sometimes forms coarse nitrides and causes deterioration of the bendability of steel sheet. Further, N sometimes causes formation of blowholes at the time of welding. Accordingly, the content of N is preferably small. Specifically, the content of N is made 0.010% or less. The lower limit of the content of N is 0. Making the content of N less than 0.001% is economically disadvantageous, so 0.001% may be made the lower limit.

"O: 0 to 0.020%"

O is an element required for forming Al oxides at the surface layer. However, if Al oxides are formed at the surface layer part, O need not be present at a position of ¼ of the thickness from the surface. Therefore, the lower limit of content of O at the position of ¼ of the thickness from the surface may be 0. However, to efficiently form Al oxides at the surface layer part, 0.001% may be made the lower limit. If the amount of O of the position of ¼ of the thickness from the surface becomes greater, the elongation falls, so the upper limit is made 0.020%.

The balance of the chemical composition of the center part of the steel sheet is comprised of Fe and impurities. However, instead of part of Fe, the following contents may also be contained.

"Cr: 0 to 3.00%, Mo: 0 to 1.00%, and B: 0 to 0.0100%"

Cr, Mo, and B are respectively elements raising the hardenability of steel to contribute to improvement of the strength of the steel sheet. The effect by these elements being included is obtained even if the contents of these elements are small amounts. The contents of these elements may be 0% as well, but to sufficiently obtain the above effects, preferably the content of Cr is 0.01% or more, the content of Mo is 0.01% or more, and the content of B is 0.0001% or more. On the other hand, from the viewpoint of keeping the pickling ability, weldability, hot formability, etc. of the steel sheet from deteriorating, the content of Cr is made 3.00% or less, the content of Mo is made 1.00% or less, and the content of B is made 0.0100% or less.

"Ti: 0 to 0.200%, Nb: 0 to 0.200%, and V: 0 to 0.20%"

Ti, Nb, and V are respectively elements contributing to improvement of the strength of steel sheet. These elements contribute to improvement of the strength of steel sheet by precipitation strengthening and suppression of growth of ferrite crystal grains for strengthening fine grains and suppression of recrystallization for dislocation strengthening. The effect by these elements being included is obtained by the contents of these elements even in small amounts. The contents of these elements may be 0% as well, but to sufficiently obtain this effect, preferably the respective contents of Ti and Nb are 0.010% or more and the content of V is 0.01% or more. However, from the viewpoint of keeping the formability of the steel sheet from deteriorating due to the precipitation of carbonitrides increasing, the respective contents of Ti and Nb are made 0.200% or less and the content of V is made 0.20% or less.

"Cu: 0 to 1.000% and Ni: 0 to 1.000%"

Cu and Ni are respectively elements contributing to improvement of the strength of steel sheet. The effect by these elements being included is obtained by the contents of these elements even in small amounts. The contents of these elements may be 0% as well, but to sufficiently obtain this effect, preferably the respective contents of Cu and Ni are 0.010% or more. On the other hand, from the viewpoint of keeping the pickling ability, weldability, hot formability, etc. of the steel sheet from deteriorating, the respective contents of Cu and Ni are made 1.000% or less.

Furthermore, at the center part of the steel sheet, the following elements may be intentionally or unavoidably included in place of part of the Fe in a range where the effect of the present invention is obtained. That is, the steel sheet of the present embodiment may contain W: 0 to 0.1%, Ta: 0 to 0.1%, Sn: 0 to 0.05%, Sb: 0 to 0.05%, As: 0 to 0.05%, Mg: 0 to 0.05%, Ca: 0 to 0.05%, Zr: 0 to 0.05%, and Y: 0 to 0.05%, La: 0 to 0.05%, Ce: 0 to 0.05%, and other REMs (rare earth metals).

Note that, the steel sheet of the present invention may further include a hot dip galvanized layer, hot dip galvannealed layer, or electrogalvanized layer on the surface of the surface layer part. In this way, even if a coating layer is formed, the steel sheet of the present invention can realize both formability and weldability by modification of the surface layer part in the above way.

Next, one example of the method for manufacture for obtaining the steel sheet of the present invention will be explained.

The present invention lies in the point of controlling the particle sizes of the large number of Al oxide grains contained in the surface layer part so as to fall in line with the above particle size distribution. Below, the method for manufacturing the steel sheet of the present invention controlling the number density and particle sizes of the Al oxide grains will be explained. Note that, the steel sheet of the present invention includes hot rolled steel sheet, cold rolled steel sheet, plated steel sheet, etc.

Hot Rolled Steel Sheet

In the present embodiment, the method for controlling the Al oxides is not particularly limited. For example, the method of adding wire to control the distribution of Al oxide grains at the surface layer part, the method of separately manufacturing steel sheet corresponding to the center part of steel sheet and steel sheet corresponding to the surface layer part in which a large number of Al oxide grains are distributed and stacking and joining these steel sheets to obtain a multi-layer steel sheet, and the method of adjusting the descaling before rough rolling to leave scale containing Al oxides at the surface of the steel sheet may be illustrated.

Below, the method of adding wire to control the distribution of Al oxide grains at the surface layer part will be explained.

In the process of pouring molten steel satisfying the chemical composition of the center part of steel sheet from a tundish to a continuous casting machine, wire shaped iron oxide is added to a portion corresponding to the surface layer part of the steel sheet to obtain a slab. FIG. 1 is a schematic view showing a method of adding wire shaped iron oxide to the surface layer part of molten steel in a continuous casting process of a method for manufacturing the steel sheet of the present invention. If iron oxide is added to the surface layer part of molten steel in this way, oxygen contained in the iron oxide bonds with Al whereby Al oxide grains are formed.

When adding wire shaped iron oxide to molten steel, 1 mm or more and 50 mm or less diameter wire shaped iron oxide is used. By the diameter of the wire (wire diameter) being made 1 mm or more, the average of the above particle size distribution which the particle sizes of the Al oxide grains should fall in line with may be made −5.0 or more. On the other hand, by the wire diameter being made 50 mm or less, the average of the above particle size distribution may be made −3.5 or less. Further, by the wire diameter being made 50 mm or less, the standard error of the above particle size distribution may be made 0.8 or less.

Further, the wire shaped iron oxide is added to the molten steel by arranging a plurality of wires in the width direction of the molten steel so that the centers of the wires pass through positions away from the surface of the molten steel by the wire diameters (mm units) or more and the wire diameters (mm units)+30 mm or less and so that the distances between the centers of the wires become the wire diameters (mm units) or more and the wire diameters (mm units)+30 mm or less. By the positions of the centers of the wires and the distances of the wires being controlled in this way, the distribution of Al oxides of the surface layers of the steel sheet and the number density of the Al oxides at the center part of the steel sheet can be suitably adjusted.

Further, wire shaped iron oxide is added to the molten steel so that the difference in the feed rate of the wire and the flow rate of molten steel becomes −500 mm/min or more and 500 mm/min or less. By the iron oxide being added to the molten steel in this way, the number density of the Al oxide grains at the surface layer part can be controlled to 3000/mm$^2$ or more and 6000/mm$^2$ or less. The faster the feed rate of the wire, the smaller the number density of the Al oxide grains tends to become. The slower the feed rate of the wire, the larger the number density of Al oxide grains tends to become.

After forming a slab having a layer forming the center part of the steel slab and a surface layer part in which Al oxide grains are distributed in the above way, the slab is heated by a 1100° C. or more and 1350° C. or less, preferably more than 1150° C. and 1350° C. or less heating temperature. By the heating temperature of the slab being made 1100° C. or more, anisotropy of the crystal orientations due to casting can be suppressed. On the other hand, by making the heating temperature of the slab 1350° C. or less, a major increase in the manufacturing costs can be suppressed.

After heating the slab in the above way, the slab is supplied to the hot rolling. This hot rolling process includes a rough rolling process and a finish rolling processing of a finishing temperature of 800° C. or more and 980° C. or less. By making the finishing temperature of the hot rolling 800° C. or more, it is easy to keep the rolling reaction force from becoming higher and stably obtain the desired sheet thickness. On the other hand, by making the finishing temperature of the hot rolling 980° C. or less, it is possible to end the hot rolling even without using a separate heating apparatus in the process from ending the heating of the slab to the completion of the hot rolling and to suppress any major increase in the manufacturing costs of the steel sheet.

After that, the steel sheet hot rolled in the above way is cooled until 550° C. or more and 750° C. or less in temperature by an average cooling rate of 2.5° C./s or more. This cooling process is a process required for rendering the majority of the steel sheet low temperature transformed structures and making the steel sheet higher in strength. By the average cooling rate being made 2.5° C./s or more, ferrite transformation or pearlite transformation is suppressed and a drop in strength of the steel sheet can be suppressed. The average cooling rate is preferably 5° C./s or more, more preferably 10° C./s or more. However, at a temperature higher than 750° C., ferrite transformation or pearlite transformation becomes hard to occur, so the average cooling rate is not limited. Further, at a temperature lower than 550° C., the structures transform to low temperature transformed structures, so the average cooling rate is not limited.

Next, the steel sheet cooled in this cooling process is coiled up. In this coiling process, the coiling temperature is made 550° C. or less. By making the coiling temperature 550° C. or less, ferrite transformation or pearlite transformation at the surface layer part of the steel sheet is suppressed. The coiling temperature is preferably 500° C. or less, more preferably 300° C. or less. In this way, it is possible to obtain the coiled up hot rolled steel sheet of the present invention.

Note that, to make the retained austenite at the center part of the steel sheet an area ratio of 10% or more to further improve the formability of steel sheet, the following process is preferably included instead of the above process after hot rolling. That is, the process of holding steel sheet which has been hot rolled in the cooling process at 700° C. or less and 500° C. or more in temperature for 3 seconds or more, then coiling it by the martensite transformation start temperature Ms or more and the bainite transformation start temperature Bs or less in temperature is preferably included. Here, the bainite transformation start temperature Bs and martensite transformation start temperature Ms are calculated by the following formulas:

$$Bs\ (°\ C.)=820-290C/(1-Sf)-37Si-90Mn-65Cr-50Ni+70Al$$

$$Ms\ (°\ C.)=541-474C/(1-Sf)-15Si-35Mn-17Cr-17Ni+19Al$$

Here, C, Si, Mn, Cr, Ni, and Al are the contents (mass %) of the elements contained in the slab and Sf is the area ratio of ferrite at the center part of the steel sheet.

Note that, it is difficult to find the area ratio of ferrite of steel sheet during manufacture. For this reason, in the present invention, steel sheet treated by a heat history similar to the manufacturing process of actual steel sheet is prepared in advance and the area ratio of ferrite at the center part of the steel sheet at that steel sheet is found. This area ratio of ferrite is used for calculating the Bs and Ms. Note that, the area ratio of ferrite can be found in the following way. First, a sample having a thickness cross-section parallel to the rolling direction of the steel sheet is taken and that cross-section is made the observed surface. In the observed surface, the 100 μm×100 μm region centered about the position of ¼ of the thickness from the steel sheet surface is made the observed region. The electron channeling contrast image seen by examining this observed region by a scanning electron microscope at 3000× is an image showing the difference in crystal orientations of the crystal grains as a difference in contrast. The parts of uniform contrast in this electron channeling contrast image are ferrite. Further, the area ratio of the ferrite identified in this way is calculated by the point counting method (based on ASTM E562).

Cold Rolled Steel Sheet

Next, an example of the method for manufacturing cold rolled steel sheet in the steel sheet encompassed by the present invention will be explained.

First, a slab is obtained in the same way as the above example of hot rolled steel sheet, then the slab is heated in the same way as the example of manufacture of hot rolled steel sheet and hot rolled. After that, in the same way as the example of manufacture of hot rolled steel, the steel sheet which was hot rolled is cooled and coiled. However, in the coiling process, the coiling temperature is made 20° C. or more and 700° C. or less.

Next, the hot rolled steel sheet coiled up in the above way is uncoiled and pickled. This pickling process removes oxides (scale) at the surface of the hot rolled steel sheet. This may be performed one time or divided into several times.

Next, the steel sheet is cold rolled. In this cold rolling process, preferably the total rolling reduction is 85% or less. By the total rolling reduction being made 85% or less, the ductility of the center part of the steel sheet is kept from dropping and the center part of the steel sheet is kept from fracturing during cold rolling. On the other hand, to sufficiently promote recrystallization in the next annealing process, the total reduction rate in the cold rolling process is preferably 20% or more, more preferably 30% or more. Before cold rolling, to reduce the cold rolling load, the steel sheet may be annealed at 700° C. or less in temperature.

After the cold rolling process, the steel sheet is annealed. In this annealing process, to make the steel sheet higher in strength, it is important to make the majority of the structures of the steel sheet low temperature transformed structures and suppress ferrite transformation and pearlite transformation. In the annealing process, first, the steel sheet is held at the Ac3 point-100° C. or more and 900° C. or less in temperature at the center part of the steel sheet for 5 seconds or more. The reason for making the heating temperature the Ac3 point-100° C. or more at the center part of the steel sheet is that by heating the center part of the steel sheet to the dual-phase region of ferrite and austenite or the single phase region of austenite, by subsequent heat treatment, transformed structures are obtained and steel sheet having the desired strength is obtained. On the other hand, by making the heating temperature in the annealing process 900° C. or less, it is possible to keep the prior austenite grains at the center part of the steel sheet from becoming coarser and to keep the toughness of the steel sheet from deteriorating.

Note that, the Ac3 point is found by the following formula:

$$Ac3 \ (° C.)=910-203\sqrt{C}+44.7Si-30Mn+700P-20Cu-15.2Ni-11Cr+31.5Mo+400Ti+104V+120Al$$

Here, C, Si, Mn, P, Cu, Ni, Cr, Mo, Ti, V, and Al are the contents (mass %) of the elements contained in the slab.

After the above annealing process, the annealed steel sheet can be cooled from 550° C. or more to 750° C. or less in temperature by an average cooling rate of 2.5° C./s or more to obtain the cold rolled steel sheet of the present invention. This cooling process is a process required for making the steel sheet higher in strength. By the average cooling rate being made 2.5° C./s or more, ferrite transformation or pearlite transformation is suppressed and a drop in strength of the steel sheet can be suppressed. The average cooling rate is preferably 5° C./s or more, more preferably 10° C./s or more. However, at a temperature higher than 750° C., ferrite transformation or pearlite transformation becomes hard to occur, so the average cooling rate is not limited. Further, at a temperature lower than 550° C., the structures transform to low temperature transformed structures, so the average cooling rate is not limited. At a temperature of 550° C. or less, the steel sheet may be cooled by a constant cooling rate down to room temperature. The steel sheet may be held at a temperature of 200° C. or more and 550° C. or less to promote bainite transformation or temper the martensite. However, if holding steel sheet at 300° C. or more and 550° C. or less for a long period of time, the strength of the steel sheet may fall, so if holding steel sheet at that temperature region, the holding time is preferably 600 seconds or less.

Note that to render the retained austenite at the center part of the steel sheet an area ratio of 10% or more to further improve the formability of the steel sheet, it is preferable to perform the following heating and cooling instead of the annealing process after cold rolling explained above.

First, the steel sheet is heated until 700° C. or more and 900° C. or less and held there for 5 seconds. The reason for making the heating temperature 700° C. or more is to make recrystallization sufficiently advance and lower the noncrystallized fraction. Further, by making the heating temperature 900° C. or less, the prior austenite of the center part of the steel sheet can be kept from coarsening and the toughness from being made to deteriorate. Further, by making the holding time 5 seconds or more, it is possible to advance the austenite transformation and keep the strength of the steel sheet from falling. From this viewpoint, the holding time is preferably 10 seconds or more, more preferably 20 seconds or more.

The steel sheet which is heated and held is cooled so that the center part of the steel sheet satisfies a 10° C./s or more average cooling rate from Ms-100° C. or more and less than Bs in cooling stop temperature. In this cooling, the average cooling rate in the 750° C. to 550° C. temperature region is 2.5° C./s or more.

Further, the next precooling process may be performed so as to obtain the desired area ratio of ferrite in this cooling process.

As an option, this includes precooling making the steel sheet dwell from that temperature to a precooling stop temperature of the Bs point of the center part of the steel sheet or more to less than the Ac3 point-40° C. for 5 seconds or more and less than 400 seconds. Such a precooling process may be performed in accordance with need. The subsequent cooling process may also be performed without this precooling process.

To ensure that after this cooling, the area ratio of the retained austenite at the center part of the steel sheet becomes 10% or more, the temperature is controlled so that the center part of the steel sheet dwells at the 300° C. or more and 500° C. or less temperature region for 30 seconds or more and 600 seconds or less. During this dwell time, it is also possible to perform heating and cooling a plurality of times as desired in accordance with need. For stabilization of the retained austenite, this dwell time is important. Note that, the methods of finding Ac3, Bs, and Ms are as explained above.

The above explanation is meant to just illustrate the method of manufacture for obtaining the steel sheet of the present invention. As explained above, the method of manufacture of the steel sheet of the present invention is not limited to method of using the addition of wire for controlling the distribution of Al oxide grains of the surface layer part.

Plated Steel Sheet

Next, an example of the method for manufacturing plated steel encompassed by the present invention will be explained.

The surface of the surface layer part of the cold rolled steel sheet manufactured in this way is hot dip galvanized to obtain hot dip galvanized steel sheet. If hot dip galvanizing it, the coating bath temperature may be the conventionally used condition. That is, the coating bath temperature is, for example, made 440° C. or more and 550° C. or less.

Further, as explained above, after performing hot dip galvanization, hot dip galvannealed steel sheet is obtained by performing heating and alloying treatment. As the heating temperature in the alloying in the case of heating and alloying treatment, the condition applied in the past may be used. That is, the heating temperature of the alloying is, for example, made 400° C. or more and 600° C. or less. The heating method in the alloying is not particularly limited. Direct heating by combustion gas, induction heating, direct resistance heating, and other heating systems suitable for hot dip coating facilities in the past can be used. After the alloying treatment, the steel sheet is cooled to 200° C. or less and is skin-pass rolled in accordance with need.

Further, as the method for manufacturing electrogalvanized steel sheet, the following example may be mentioned. For example, the cold rolled steel sheet is treated before coating by alkali degreasing, rinsing, pickling, and rinsing in that order. After that, the pretreated steel sheet is, for example, electrolytically treated using a liquid circulation type electroplating apparatus, using a plating bath comprised of zinc sulfate, sodium sulfate, and sulfuric acid, and using a current density of 100 A/dm$^2$ or so until a predetermined plating thickness.

EXAMPLES

Thickness 250 mm continuously cast slabs having the chemical compositions shown in Table 1 were manufactured. In the process, wire shaped iron oxide was added under the conditions shown in Tables 2-1 to 2-3 to obtain slabs having Al oxides distributed at the surface layer parts. Whether the wire shaped iron oxide was added to the surface layer parts at one side or the wire shaped iron oxide was added to the surface layer parts at two sides is shown as the "position of surface layer part" in Tables 4-1 to 4-3. The slabs were supplied for hot rolling under conditions of the heating temperatures, finishing temperatures, and coiling temperatures shown in Tables 2-1 to 2-3 to obtain hot rolled steel sheets. For steel sheets to be used as cold rolled steel sheets, after obtaining hot rolled steel sheets as explained above, the sheets were pickled and cold rolled by total reduction rates of 50% then annealed under the conditions shown in Tables 2-1 to 2-3. Further, some of the steel sheets were coated by an ordinary method to obtain plated steel sheets as shown in Tables 2-1 to 2-3.

Further, some of the steel sheets are annealed as shown in Tables 3-1 to 3-3 so as to make the retained austenite of the center part of the sheet thickness an area ratio of 10% or more.

The results of evaluation of the obtained steel sheets are shown in Tables 4-1 to 5-3. Details of the "number density" of Al oxides at the surface layer parts shown in Tables 5-1 to 5-3, "average", "standard error", and "ratio deviated from average" and the method of measurement of the "area ratio of retained austenite" are as explained above. Further, the chemical compositions at the positions of ¼ of the thickness from the surface of the obtained steel sheet are shown in Tables 4-1 to 4-3. Furthermore, the obtained steel sheets were subjected to tensile tests and welding tests as follows.

The tensile strength (MPa) and total elongation (%) were measured by preparing a JIS No. 5 test piece in accordance with JIS Z 2241 (2011) having a direction perpendicular to the rolling direction as the long axis and subjecting it to a tensile test. In the present embodiment, a case where the tensile strength was 780 MPa or more and the value of the tensile strength×total elongation was 10000 MPa % or more was deemed passing.

Further, the welding test was performed as follows. A test piece described in JIS Z 3137 (1999) was taken from the steel sheet. A servo motor pressure type single-phase AC spot welder (power frequency 50 Hz) was used to weld another steel sheet to this test piece. After that, the cross tensile force was measured in accordance with JIS Z 3137 (1999). In the present embodiment, a case of more than 6.0 kN was deemed passing.

TABLE 1

| Steel type No. | Slab composition (mass %) | | | | | | | | | | | | | | | | Ac3 (° C.) | Remarks |
|---|---|---|---|---|---|---|---|---|---|---|---|---|---|---|---|---|---|---|
| | C | Si | Mn | P | S | N | Al | O | B | Ti | Nb | V | Mo | Cr | Ni | Cu | | |
| A | 0.104 | 0.86 | 1.33 | 0.001 | 0.005 | 0.001 | 0.679 | 0.010 | 0.0019 | 0.033 | 0.043 | 0.03 | 0.07 | 0.24 | 0.208 | 0.536 | 927 | Inv. steel |
| B | 0.405 | 0.70 | 1.06 | 0.001 | 0.004 | 0.003 | 0.691 | 0.001 | 0.0015 | 0.026 | 0.022 | 0.05 | 0.10 | 0.32 | 0.772 | 0.291 | 862 | Inv. steel |
| C | 0.674 | 0.11 | 0.91 | 0.002 | 0.010 | 0.001 | 0.642 | 0.018 | 0.0008 | 0.030 | 0.172 | 0.04 | 0.07 | 1.14 | 0.096 | 0.849 | 787 | Inv. steel |
| D | 0.590 | 0.75 | 2.78 | 0.001 | 0.013 | 0.001 | 1.560 | 0.005 | 0.0009 | 0.030 | 0.026 | 0.17 | 0.19 | 2.55 | 0.865 | 0.088 | 885 | Inv. steel |
| E | 0.158 | 1.01 | 6.98 | 0.007 | 0.003 | 0.000 | 0.833 | 0.001 | 0.0073 | 0.148 | 0.030 | 0.02 | 0.82 | 0.30 | 0.079 | 0.730 | 838 | Inv. steel |
| F | 0.301 | 0.05 | 1.17 | 0.001 | 0.002 | 0.001 | 0.834 | 0.019 | 0.0055 | 0.041 | 0.030 | 0.03 | 0.09 | 0.77 | 0.094 | 0.097 | 877 | Inv. steel |
| G | 0.176 | 0.19 | 3.17 | 0.001 | 0.003 | 0.001 | 0.780 | 0.001 | 0.0009 | 0.026 | 0.026 | 0.02 | 0.08 | 0.34 | 0.066 | 0.066 | 841 | Inv. steel |
| H | 0.658 | 1.11 | 2.58 | 0.003 | 0.002 | 0.009 | 0.673 | 0.001 | 0.0007 | 0.023 | 0.060 | 0.03 | 0.54 | 1.61 | 0.531 | 0.067 | 803 | Inv. steel |
| I | 0.199 | 1.15 | 1.00 | 0.001 | 0.008 | 0.002 | 0.725 | 0.006 | 0.0006 | 0.034 | 0.023 | 0.02 | 0.10 | 0.14 | 0.069 | 0.111 | 943 | Inv. steel |
| J | 0.230 | 0.91 | 2.40 | 0.009 | 0.042 | 0.001 | 0.915 | 0.001 | 0.0086 | 0.020 | 0.021 | 0.11 | 0.10 | 0.28 | 0.156 | 0.146 | 912 | Inv. steel |
| K | 0.130 | 0.38 | 0.91 | 0.001 | 0.037 | 0.005 | 0.602 | 0.002 | 0.0030 | 0.170 | 0.022 | 0.06 | 0.12 | 0.22 | 0.284 | 0.089 | 969 | Inv. steel |
| L | 0.212 | 0.29 | 6.87 | 0.001 | 0.004 | 0.001 | 2.331 | 0.005 | 0.0009 | 0.105 | 0.026 | 0.15 | 0.26 | 0.16 | 0.049 | 0.093 | 965 | Inv. steel |
| M | 0.171 | 0.83 | 1.89 | 0.005 | 0.004 | 0.008 | 0.688 | 0.001 | 0.0008 | 0.029 | 0.029 | 0.03 | 0.74 | 0.53 | 0.084 | 0.076 | 922 | Inv. steel |
| N | 0.292 | 0.80 | 2.19 | 0.001 | 0.026 | 0.001 | 1.151 | 0.003 | 0.0008 | 0.019 | 0.151 | 0.03 | 0.12 | 0.41 | 0.115 | 0.068 | 916 | Inv. steel |
| O | 0.132 | 1.08 | 2.28 | 0.001 | 0.003 | 0.001 | 0.833 | 0.004 | 0.0009 | 0.065 | 0.116 | 0.02 | 0.08 | 0.32 | 0.105 | 0.165 | 939 | Inv. steel |
| P | 0.034 | 0.31 | 2.15 | 0.009 | 0.006 | 0.001 | 2.451 | 0.014 | 0.0011 | 0.037 | 0.044 | 0.04 | 0.66 | 0.12 | 0.121 | 0.816 | 1143 | Comp. steel |
| Q | 0.823 | 1.06 | 6.55 | 0.001 | 0.003 | 0.001 | 0.714 | 0.001 | 0.0010 | 0.024 | 0.029 | 0.06 | 0.74 | 0.28 | 0.074 | 0.098 | 696 | Comp. steel |
| R | 0.306 | 0.39 | 2.75 | 0.011 | 0.003 | 0.001 | 0.037 | 0.010 | | | | | 0.12 | 0.36 | | | 745 | Inv. steel |
| S | 0.166 | 0.83 | 2.20 | 0.006 | 0.003 | 0.002 | 0.013 | 0.001 | 0.0018 | 0.024 | | | | | | | 814 | Inv. steel |
| T | 0.232 | 0.94 | 2.50 | 0.051 | 0.004 | 0.003 | 0.533 | 0.003 | | 0.006 | 0.005 | 0.01 | | | | | 882 | Inv. steel |

TABLE 1-continued

| Steel type No. | Slab composition (mass %) | | | | | | | | | | | | | | | Ac3 (° C.) | Remarks |
|---|---|---|---|---|---|---|---|---|---|---|---|---|---|---|---|---|---|
| | C | Si | Mn | P | S | N | Al | O | B | Ti | Nb | V | Mo | Cr | Ni | Cu | | |
| U | 0.270 | 0.81 | 2.70 | 0.009 | 0.042 | 0.001 | 0.715 | 0.004 | | | | | | | | | 852 | Inv. steel |
| V | 0.301 | 1.15 | 2.10 | 0.001 | 0.008 | 0.002 | 0.425 | 0.001 | | | | | | | | | 839 | Inv. steel |

TABLE 2-1

| Steel type | No. | Steel sheet | Classification | Continuous casting | | | | Hot rolling | | | | Annealing | | |
|---|---|---|---|---|---|---|---|---|---|---|---|---|---|---|
| | | | | Iron oxide diameter (mm) | Iron oxide wire center position (mm) | Iron oxide wire distance (mm) | Difference of iron oxide wire feed rate and molten steel flow rate (mm/min) | Heating temp. (° C.) | Hot rolling finish temp. (° C.) | 750° C. to 550° C. average cooling rate (° C./s) | Coiling temp. (° C.) | Heating temp. (° C.) | Heating holding time (s) | 750° C. to 550° C. average cooling rate (° C./s) |
| A | 1 | Cold rolled sheet | Ex. | 4 | 15 | 31 | 14 | 1327 | 819 | 47 | 415 | 885 | 109 | 46 |
| A | 2 | Cold rolled sheet | Ex. | 5 | 23 | 23 | −257 | 1221 | 839 | 42.4 | 493 | 869 | 243 | 44 |
| A | 3 | Cold rolled sheet | Ex. | 15 | 21 | 25 | −481 | 1106 | 895 | 9.5 | 493 | 897 | 76 | 45 |
| B | 4 | Cold rolled sheet | Ex. | 6 | 31 | 35 | −203 | 1255 | 930 | 45.7 | 60 | 806 | 98 | 47 |
| B | 5 | Cold rolled sheet | Ex. | 26 | 39 | 35 | 303 | 1203 | 878 | 48 | 72 | 826 | 37 | 16 |
| B | 6 | Hot rolled sheet | Ex. | 28 | 58 | 58 | 62 | 1223 | 941 | 29.6 | 521 | — | — | — |
| C | 7 | Cold rolled sheet | Ex. | 46 | 61 | 67 | 470 | 1160 | 961 | 27.8 | 527 | 743 | 84 | 10 |
| C | 8 | Cold rolled sheet | Ex. | 22 | 46 | 38 | 224 | 1165 | 858 | 47.3 | 509 | 741 | 186 | 48 |
| C | 9 | Cold rolled sheet | Ex. | 32 | 38 | 57 | −14 | 1244 | 838 | 46.5 | 484 | 759 | 53 | 10 |
| D | 10 | Cold rolled sheet | Ex. | 24 | 29 | 44 | 380 | 1137 | 883 | 9.2 | 497 | 885 | 229 | 40 |
| D | 11 | Cold rolled sheet | Ex. | 41 | 51 | 50 | 369 | 1261 | 976 | 29.9 | 307 | 871 | 229 | 38 |
| D | 12 | Hot rolled sheet | Ex. | 46 | 72 | 59 | −157 | 1256 | 909 | 37.6 | 87 | — | — | — |
| E | 13 | Hot dip galvannealed steel sheet | Ex. | 48 | 73 | 77 | −84 | 1202 | 862 | 47.5 | 94 | 832 | 22 | 30 |
| E | 14 | Cold rolled sheet | Ex. | 14 | 18 | 37 | −19 | 1267 | 890 | 16.3 | 502 | 818 | 163 | 47 |
| E | 15 | Cold rolled sheet | Ex. | 40 | 46 | 44 | −258 | 1123 | 851 | 45.5 | 431 | 780 | 133 | 29 |
| F | 16 | Cold rolled sheet | Ex. | 17 | 41 | 24 | 174 | 1105 | 934 | 46.2 | 514 | 873 | 207 | 44 |
| F | 17 | Cold rolled sheet | Ex. | 46 | 53 | 67 | 73 | 1106 | 831 | 45.2 | 88 | 861 | 10 | 8 |
| F | 18 | Hot rolled sheet | Ex. | 13 | 43 | 34 | −224 | 1168 | 865 | 47.9 | 321 | — | — | — |
| G | 19 | Cold rolled sheet | Ex. | 20 | 22 | 47 | −424 | 1297 | 891 | 46.3 | 463 | 797 | 160 | 47 |
| G | 20 | Cold rolled sheet | Ex. | 30 | 41 | 53 | −401 | 1319 | 954 | 47.5 | 520 | 831 | 153 | 48 |
| G | 21 | Cold rolled sheet | Ex. | 22 | 41 | 35 | 148 | 1214 | 976 | 46.2 | 501 | 801 | 283 | 47 |
| H | 22 | Cold rolled sheet | Ex. | 14 | 29 | 44 | 42 | 1194 | 916 | 11.6 | 506 | 749 | 37 | 48 |
| H | 23 | Cold rolled sheet | Ex. | 2 | 7 | 23 | 143 | 1345 | 915 | 46.1 | 491 | 745 | 215 | 44 |
| H | 24 | Hot rolled sheet | Ex. | 39 | 51 | 69 | 182 | 1288 | 822 | 47 | 526 | — | — | — |
| I | 25 | Cold rolled sheet | Ex. | 41 | 50 | 69 | −279 | 1126 | 974 | 48 | 495 | 889 | 249 | 45 |
| I | 26 | Hot dip galvannealed steel sheet | Ex. | 19 | 41 | 48 | −37 | 1291 | 906 | 47 | 518 | 881 | 78 | 28 |

TABLE 2-2

| Steel type | No. | Steel sheet | Classification | Continuous casting | | | | Hot rolling | | | | Annealing | | |
|---|---|---|---|---|---|---|---|---|---|---|---|---|---|---|
| | | | | Iron oxide diameter (mm) | Iron oxide wire center position (mm) | Iron oxide wire distance (mm) | Difference of iron oxide wire feed rate and molten steel flow rate (mm/min) | Heating temp. (° C.) | Hot rolling finish temp. (° C.) | 750° C. to 550° C. average cooling rate (° C./s) | Coiling temp. (° C.) | Heating temp. (° C.) | Heating holding time (s) | 750° C. to 550° C. average cooling rate (° C./s) |
| I | 27 | Cold rolled sheet | Ex. | 26 | 53 | 29 | 455 | 1273 | 885 | 47.2 | 523 | 891 | 186 | 47 |
| I | 28 | Cold rolled sheet | Ex. | 20 | 41 | 50 | 241 | 1338 | 883 | 46.2 | 82 | 895 | 167 | 47 |
| J | 29 | Cold rolled sheet | Ex. | 29 | 32 | 58 | 343 | 1275 | 857 | 43.8 | 165 | 880 | 132 | 44 |

TABLE 2-2-continued

| | | | | Continuous casting | | | | Hot rolling | | | Annealing | | |
|---|---|---|---|---|---|---|---|---|---|---|---|---|---|
| Steel type | No. | Steel sheet | Classification | Iron oxide wire diameter (mm) | Iron oxide wire center position (mm) | Iron oxide wire distance (mm) | Difference of iron oxide wire feed rate and molten steel flow rate (mm/min) | Heating temp. (° C.) | Hot rolling finish temp. (° C.) | 750° C. to 550° C. average cooling rate (° C./s) | Coiling temp. (° C.) | Heating temp. (° C.) | Heating holding time (s) | 750° C. to 550° C. average cooling rate (° C./s) |
| J | 30 | Cold rolled sheet | Ex. | 43 | 61 | 72 | 388 | 1106 | 899 | 39 | 83 | 888 | 103 | 48 |
| J | 31 | Cold rolled sheet | Ex. | 35 | 62 | 52 | 334 | 1164 | 964 | 10.4 | 471 | 870 | 29 | 45 |
| K | 32 | Cold rolled sheet | Ex. | 35 | 36 | 53 | 111 | 1245 | 835 | 44.7 | 478 | 887 | 191 | 16 |
| K | 33 | Cold rolled sheet | Ex. | 10 | 19 | 36 | −474 | 1303 | 935 | 46.1 | 146 | 883 | 289 | 47 |
| K | 34 | Cold rolled sheet | Ex. | 16 | 31 | 28 | 44 | 1345 | 962 | 12 | 504 | 891 | 211 | 48 |
| L | 35 | Cold rolled sheet | Ex. | 39 | 58 | 44 | −135 | 1303 | 897 | 17.5 | 501 | 879 | 174 | 44 |
| L | 36 | Cold rolled sheet | Ex. | 33 | 45 | 60 | 249 | 1137 | 809 | 12 | 424 | 885 | 64 | 46 |
| L | 37 | Hot dip galvanized steel sheet | Ex. | 48 | 59 | 52 | −254 | 1322 | 859 | 45.4 | 488 | 889 | 296 | 46 |
| L | 38 | Cold rolled sheet | Ex. | 4 | 20 | 5 | 420 | 1271 | 812 | 15.5 | 522 | 887 | 271 | 43 |
| M | 39 | Cold rolled sheet | Ex. | 21 | 40 | 45 | −349 | 1232 | 839 | 43 | 487 | 864 | 271 | 48 |
| M | 40 | Cold rolled sheet | Ex. | 12 | 16 | 24 | −148 | 1303 | 846 | 45.4 | 162 | 890 | 224 | 10 |
| M | 41 | Cold rolled sheet | Ex. | 48 | 61 | 53 | 463 | 1187 | 927 | 45.3 | 497 | 868 | 10 | 45 |
| N | 42 | Cold rolled sheet | Ex. | 31 | 36 | 57 | 282 | 1347 | 954 | 46.4 | 511 | 884 | 52 | 8 |
| N | 43 | Cold rolled sheet | Ex. | 49 | 77 | 63 | −120 | 1238 | 863 | 44.9 | 508 | 874 | 271 | 42 |
| N | 44 | Cold rolled sheet | Ex. | 2 | 16 | 9 | −177 | 1187 | 804 | 47.5 | 505 | 892 | 115 | 48 |
| N | 45 | Cold rolled sheet | Ex. | 10 | 24 | 39 | −51 | 1139 | 953 | 46.3 | 504 | — | — | — |
| O | 46 | Cold rolled sheet | Ex. | 10 | 40 | 39 | −479 | 1183 | 812 | 40.1 | 308 | 881 | 293 | 42 |
| O | 47 | Cold rolled sheet | Ex. | 36 | 37 | 60 | −171 | 1192 | 956 | 44.8 | 509 | 881 | 105 | 45 |
| O | 48 | Cold rolled sheet | Ex. | 33 | 55 | 63 | 5 | 1290 | 883 | 30.2 | 310 | 893 | 30 | 47 |
| O | 49 | Electroplated steel sheet | Ex. | 5 | 17 | 33 | −412 | 1317 | 833 | 41.7 | 506 | 885 | 250 | 11 |
| A | 50 | Cold rolled sheet | Comp. ex. | 0.5 | 25 | 26 | 452 | 1182 | 886 | 46.6 | 491 | 871 | 102 | 28 |
| A | 51 | Cold rolled sheet | Comp. ex. | 29 | 25 | 34 | −129 | 1159 | 879 | 47 | 501 | 887 | 193 | 46 |
| B | 52 | Cold rolled sheet | Comp. ex. | 27 | 67 | 52 | 118 | 1182 | 865 | 15.3 | 508 | 826 | 211 | 39 |

TABLE 2-3

| | | | | Continuous casting | | | | Hot rolling | | | Annealing | | |
|---|---|---|---|---|---|---|---|---|---|---|---|---|---|
| Steel type | No. | Steel sheet | Classification | Iron oxide wire diameter (mm) | Iron oxide wire center position (mm) | Iron oxide wire distance (mm) | Difference of iron oxide wire feed rate and molten steel flow rate (mm/min) | Heating temp. (° C.) | Hot rolling finish temp. (° C.) | 750° C. to 550° C. average cooling rate (° C./s) | Coiling temp. (° C.) | Heating temp. (° C.) | Heating holding time (s) | 750° C. to 550° C. average cooling rate (° C./s) |
| B | 53 | Cold rolled sheet | Comp. ex. | 42 | 63 | 93 | 182 | 1249 | 894 | 45.6 | 207 | 854 | 256 | 37 |

TABLE 2-3-continued

| | | | | Continuous casting | | | | Hot rolling | | | | Annealing | | |
|---|---|---|---|---|---|---|---|---|---|---|---|---|---|---|
| Steel type | No. | Steel sheet | Classification | Iron oxide wire diameter (mm) | Iron oxide wire center position (mm) | Iron oxide wire distance (mm) | Difference of iron oxide wire feed rate and molten steel flow rate (mm/min) | Heating temp. (° C.) | Hot rolling finish temp. (° C.) | 750° C. to 550° C. average cooling rate (° C./s) | Coiling temp. (° C.) | Heating temp. (° C.) | Heating holding time (s) | 750° C. to 550° C. average cooling rate (° C./s) |
| C | 54 | Cold rolled sheet | Comp. ex. | 20 | 21 | 49 | 530 | 1159 | 850 | 40.6 | 495 | 747 | 278 | 9 |
| E | 55 | Cold rolled sheet | Comp. ex. | 24 | 37 | 54 | −333 | 1177 | 924 | 0.7 | 522 | 824 | 260 | 10 |
| N | 56 | Cold rolled sheet | Ex. | 21 | 51 | 43 | −159 | 1122 | 945 | 45.3 | 371 | 894 | 112 | 14 |
| P | 57 | Cold rolled sheet | Comp. ex. | 15 | 30 | 38 | −481 | 1106 | 895 | 9.5 | 493 | 897 | 76 | 45 |
| Q | 58 | Cold rolled sheet | Comp. ex. | 28 | 58 | 47 | 62 | 1223 | 941 | 29.6 | 521 | 774 | 113 | 44 |
| G | 59 | Cold rolled sheet | Comp. ex. | 12 | 38 | 36 | 199 | 1254 | 824 | 46.5 | 478 | 685 | 115 | 14 |
| H | 60 | Cold rolled sheet | Comp. ex. | 38 | 66 | 68 | −287 | 1123 | 894 | 22 | 89 | 802 | 4 | 42 |
| I | 61 | Cold rolled sheet | Comp. ex. | 20 | 29 | 44 | −157 | 1249 | 900 | 42.7 | 467 | 882 | 199 | 2 |
| R | 62 | Cold rolled sheet | Ex. | 15 | 22 | 26 | −461 | 1106 | 878 | 9.5 | 572 | 758 | 76 | 46 |
| S | 63 | Cold rolled sheet | Ex. | 41 | 49 | 50 | 349 | 1137 | 862 | 45.7 | 620 | 792 | 98 | 44 |
| T | 64 | Cold rolled sheet | Ex. | 46 | 52 | 66 | 74 | 1319 | 915 | 48 | 580 | 863 | 37 | 25 |
| U | 65 | Cold rolled sheet | Ex. | 45 | 66 | 49 | 134 | 1273 | 935 | 29.6 | 571 | 841 | 84 | 37 |
| V | 66 | Cold rolled sheet | Ex. | 19 | 37 | 43 | −41 | 1164 | 927 | 27.8 | 612 | 821 | 186 | 46 |
| A | 67 | Cold rolled sheet | Comp. ex. | 54 | 68 | 78 | −34 | 1208 | 958 | 40.6 | 509 | 897 | 156 | 42 |
| B | 68 | Cold rolled sheet | Comp. ex. | 46 | 69 | 24 | 313 | 1196 | 890 | 42.7 | 512 | 809 | 98 | 29 |
| C | 69 | Cold rolled sheet | Comp. ex. | 29 | 49 | 46 | −526 | 1309 | 901 | 35.7 | 488 | 767 | 266 | 43 |
| L | 70 | Hot rolled sheet | Comp. ex. | 61 | 67 | 67 | 76 | 1235 | 924 | 47 | 504 | — | — | — |
| M | 71 | Hot rolled sheet | Comp. ex. | 0.6 | 22 | 9 | 30 | 1293 | 945 | 47.2 | 501 | — | — | — |
| N | 72 | Hot rolled sheet | Comp. ex. | 10 | 47 | 30 | −71 | 1254 | 895 | 46.2 | 424 | — | — | — |
| O | 73 | Hot rolled sheet | Comp. ex. | 24 | 19 | 40 | −139 | 1303 | 941 | 43.8 | 488 | — | — | — |
| S | 74 | Hot rolled sheet | Comp. ex. | 18 | 29 | 53 | 60 | 1173 | 824 | 39 | 522 | — | — | — |
| T | 75 | Hot rolled sheet | Comp. ex. | 32 | 51 | 27 | −136 | 1302 | 894 | 10.4 | 487 | — | — | — |
| U | 76 | Hot rolled sheet | Comp. ex. | 34 | 60 | 53 | 604 | 1171 | 900 | 44.7 | 526 | — | — | — |
| V | 77 | Hot rolled sheet | Comp. ex. | 18 | 24 | 24 | −549 | 1232 | 878 | 46.1 | 497 | — | — | — |

TABLE 3-1

Additional conditions of annealing making retained austenite area ratio of 10% or more

| | | Dwell | | | 300° C. to 500° C. | | Remarks | | |
|---|---|---|---|---|---|---|---|---|---|
| Steel type | No. | Precooling stop temp. (° C.) | time in precooling (s) | Cooling rate (° C./s) | Cooling stop temp. (° C.) | dwell time (s) | Ms-100° C. or more dwell time | Ferrite fraction Sα (%) | Bs (° C.) | Ms (° C.) |
| A | 1 | — | — | 22 | 456 | 444 | 473 | 28 | 648 | 418 |
| A | 2 | — | — | 81 | 469 | 241 | 248 | 35 | 644 | 411 |
| A | 3 | 879 | 47 | 76 | 395 | 482 | 511 | 24 | 650 | 422 |

TABLE 3-1-continued

Additional conditions of annealing making retained austenite area ratio of 10% or more

| Steel type | No. | Precooling stop temp. (° C.) | Dwell time in precooling (s) | Cooling rate (° C./s) | Cooling stop temp. (° C.) | 300° C. to 500° C. dwell time (s) | Ms-100° C. or more dwell time | Ferrite fraction Sα (%) | Bs (° C.) | Ms (° C.) |
|---|---|---|---|---|---|---|---|---|---|---|
| B | 4 | — | — | — | — | — | — | 21 | 539 | 245 |
| B | 5 | — | — | — | — | — | — | 20 | 541 | 248 |
| B | 6 | — | — | — | — | — | — | 29 | 522 | 218 |
| C | 7 | — | — | — | — | — | — | 22 | 449 | 89 |
| C | 8 | — | — | — | — | — | — | 23 | 446 | 84 |
| C | 9 | — | — | — | — | — | — | 14 | 473 | 127 |
| D | 10 | — | — | — | — | — | — | 0 | 271 | 124 |
| D | 11 | — | — | — | — | — | — | 7 | 258 | 103 |
| D | 12 | — | — | — | — | — | — | 1 | 269 | 122 |
| E | 13 | — | — | 92 | 197 | 270 | 287 | 20 | 132 | 197 |
| E | 14 | — | — | 93 | 237 | 453 | 462 | 20 | 132 | 197 |
| E | 15 | 780 | 40 | 36 | 190 | 477 | 507 | 29 | 125 | 185 |
| F | 16 | — | — | — | — | — | — | 2 | 627 | 355 |
| F | 17 | — | — | — | — | — | — | 8 | 622 | 345 |
| F | 18 | — | — | — | — | — | — | 12 | 617 | 338 |
| G | 19 | — | — | 93 | 381 | 310 | 316 | 25 | 489 | 324 |
| G | 20 | — | — | 95 | 359 | 359 | 389 | 20 | 493 | 331 |
| G | 21 | — | — | — | — | — | — | 20 | 493 | 331 |
| H | 22 | — | — | — | — | — | — | 27 | 201 | −17 |
| H | 23 | — | — | — | — | — | — | 29 | 194 | −29 |
| H | 24 | — | — | — | — | — | — | 13 | 243 | 52 |
| I | 25 | — | — | 96 | 460 | 489 | 504 | 31 | 642 | 362 |
| I | 26 | — | — | 91 | 402 | 41 | 69 | 36 | 635 | 352 |

TABLE 3-2

Additional conditions of annealing making retained austenite area ratio of 10% or more

| Steel type | No. | Precooling stop temp. (° C.) | Dwell time in precooling (s) | Cooling rate (° C./s) | Cooling stop temp. (° C.) | 300° C. to 500° C. dwell time (s) | Ms-100° C. or more dwell time | Ferrite fraction Sα (%) | Bs (° C.) | Ms (° C.) |
|---|---|---|---|---|---|---|---|---|---|---|
| I | 27 | 891 | 39 | 79 | 478 | 111 | 141 | 26 | 648 | 372 |
| I | 28 | — | — | 96 | 399 | 494 | 512 | 33 | 640 | 358 |
| J | 29 | — | — | 93 | 404 | 530 | 560 | 21 | 524 | 315 |
| J | 30 | — | — | — | — | — | — | 12 | 533 | 329 |
| J | 31 | — | — | 89 | 404 | 379 | 387 | 30 | 513 | 298 |
| K | 32 | — | — | 91 | 405 | 477 | 507 | 31 | 683 | 417 |
| K | 33 | — | — | 90 | 405 | 522 | 551 | 47 | 667 | 390 |
| K | 34 | — | — | 96 | 482 | 214 | 241 | 48 | 665 | 388 |
| L | 35 | — | — | 97 | 329 | 188 | 199 | 44 | 232 | 157 |
| L | 36 | — | — | 94 | 240 | 391 | 421 | 49 | 221 | 140 |
| L | 37 | — | — | 94 | 298 | 304 | 329 | 47 | 225 | 147 |
| L | 38 | — | — | 93 | 235 | 140 | 149 | 48 | 223 | 144 |
| M | 39 | — | — | 93 | 394 | 498 | 507 | 32 | 556 | 346 |
| M | 40 | — | — | 39 | 371 | 512 | 523 | 25 | 563 | 357 |
| M | 41 | 850 | 339 | 92 | 364 | 155 | 177 | 36 | 551 | 338 |
| N | 42 | — | — | — | — | — | — | 16 | 541 | 301 |
| N | 43 | — | — | — | — | — | — | 21 | 534 | 290 |
| N | 44 | — | — | — | — | — | — | 12 | 545 | 308 |
| N | 45 | — | — | — | — | — | — | 16 | 541 | 301 |
| O | 46 | 867 | 34 | 25 | 436 | 99 | 121 | 36 | 547 | 356 |
| O | 47 | — | — | 93 | 361 | 90 | 120 | 38 | 545 | 353 |
| O | 48 | — | — | 97 | 441 | 351 | 380 | 24 | 557 | 371 |
| O | 49 | — | — | 22 | 356 | 533 | 563 | 27 | 555 | 368 |
| A | 50 | — | — | 93 | 394 | 140 | 170 | 29 | 648 | 417 |
| A | 51 | — | — | 40 | 393 | 469 | 481 | 26 | 649 | 420 |
| B | 52 | — | — | — | — | — | — | 26 | 529 | 229 |

TABLE 3-3

Additional conditions of annealing making retained austenite area ratio of 10% or more

| Steel type | No. | Precooling stop temp. (° C.) | Dwell time in precooling (s) | Cooling rate (° C./s) | Cooling stop temp. (° C.) | 300° C. to 500° C. dwell time (s) | Ms-100° C. or more dwell time | Ferrite fraction Sα (%) | Bs (° C.) | Ms (° C.) |
|---|---|---|---|---|---|---|---|---|---|---|
| B | 53 | — | — | — | — | — | — | 20 | 541 | 248 |
| C | 54 | — | — | — | — | — | — | 20 | 456 | 99 |
| E | 55 | 798 | 339 | 95 | 190 | 437 | 466 | 20 | 132 | 197 |
| N | 56 | 876 | 51 | 93 | 364 | 10 | 29 | 20 | 536 | 292 |
| P | 57 | — | — | 76 | 250 | 482 | 510 | 33 | 327 | 316 |
| Q | 58 | — | — | — | — | — | — | 27 | 288 | −77 |
| G | 59 | — | — | 59 | 391 | 199 | 179 | 80 | 302 | 18 |
| H | 60 | 761 | 198 | 89 | 382 | 329 | 359 | 51 | 73 | −226 |
| I | 61 | 886 | 49 | 83 | 404 | 244 | 273 | 34 | 638 | 356 |
| R | 62 | — | — | 40 | 393 | 469 | 481 | 36 | 362 | 193 |
| S | 63 | — | — | — | — | — | — | 46 | 503 | 306 |
| T | 64 | 682 | 13 | 39 | 243 | 389 | 78 | 32 | 499 | 288 |
| U | 65 | — | — | 45 | 256 | 416 | 62 | 38 | 470 | 242 |
| V | 66 | — | — | — | — | — | — | 29 | 495 | 257 |
| A | 67 | — | — | 36 | 305 | 416 | 26 | 20 | 652 | 425 |
| B | 68 | — | — | — | — | — | — | 32 | 515 | 206 |
| C | 69 | — | — | — | — | — | — | 20 | 456 | 99 |
| L | 70 | — | — | — | — | — | — | — | — | — |
| M | 71 | — | — | — | — | — | — | — | — | — |
| N | 72 | — | — | — | — | — | — | — | — | — |
| O | 73 | — | — | — | — | — | — | — | — | — |
| S | 74 | — | — | — | — | — | — | — | — | — |
| T | 75 | — | — | — | — | — | — | — | — | — |
| U | 76 | — | — | — | — | — | — | — | — | — |
| V | 77 | — | — | — | — | — | — | — | — | — |

TABLE 4-1

| Steel type | No. | Classification | Composition at thickness 1/4 position (mass %) | | | | | | | | | | | | | | | |
|---|---|---|---|---|---|---|---|---|---|---|---|---|---|---|---|---|---|---|
| | | | C | Si | Mn | P | S | N | O | Al | B | Ti | Nb | V | Mo | Cr | Ni | Cu |
| A | 1 | Ex. | 0.104 | 0.85 | 1.33 | 0.001 | 0.005 | 0.001 | 0.010 | 0.668 | 0.0019 | 0.033 | 0.043 | 0.03 | 0.07 | 0.24 | 0.208 | 0.536 |
| A | 2 | Ex. | 0.104 | 0.84 | 1.30 | 0.001 | 0.005 | 0.001 | 0.009 | 0.677 | 0.0019 | 0.033 | 0.043 | 0.03 | 0.07 | 0.24 | 0.208 | 0.536 |
| A | 3 | Ex. | 0.102 | 0.86 | 1.32 | 0.001 | 0.005 | 0.001 | 0.010 | 0.678 | 0.0019 | 0.033 | 0.043 | 0.03 | 0.07 | 0.24 | 0.208 | 0.536 |
| B | 4 | Ex. | 0.405 | 0.69 | 1.04 | 0.001 | 0.004 | 0.003 | 0.001 | 0.684 | 0.0015 | 0.026 | 0.022 | 0.05 | 0.10 | 0.32 | 0.772 | 0.291 |
| B | 5 | Ex. | 0.405 | 0.70 | 1.05 | 0.001 | 0.004 | 0.003 | 0.001 | 0.688 | 0.0015 | 0.026 | 0.022 | 0.05 | 0.10 | 0.32 | 0.772 | 0.291 |
| B | 6 | Ex. | 0.402 | 0.70 | 1.04 | 0.001 | 0.004 | 0.003 | 0.001 | 0.682 | 0.0015 | 0.026 | 0.022 | 0.05 | 0.10 | 0.32 | 0.772 | 0.291 |
| C | 7 | Ex. | 0.670 | 0.11 | 0.90 | 0.002 | 0.010 | 0.001 | 0.018 | 0.630 | 0.0008 | 0.030 | 0.172 | 0.04 | 0.07 | 1.14 | 0.096 | 0.849 |
| C | 8 | Ex. | 0.666 | 0.11 | 0.89 | 0.002 | 0.010 | 0.001 | 0.018 | 0.638 | 0.0008 | 0.029 | 0.172 | 0.04 | 0.07 | 1.14 | 0.096 | 0.849 |
| C | 9 | Ex. | 0.674 | 0.11 | 0.90 | 0.002 | 0.010 | 0.001 | 0.018 | 0.633 | 0.0008 | 0.030 | 0.172 | 0.04 | 0.07 | 1.14 | 0.096 | 0.849 |
| D | 10 | Ex. | 0.583 | 0.75 | 2.76 | 0.001 | 0.013 | 0.001 | 0.005 | 1.534 | 0.0009 | 0.029 | 0.026 | 0.17 | 0.19 | 2.55 | 0.865 | 0.088 |
| D | 11 | Ex. | 0.590 | 0.74 | 2.78 | 0.001 | 0.013 | 0.001 | 0.005 | 1.538 | 0.0009 | 0.030 | 0.026 | 0.17 | 0.19 | 2.55 | 0.865 | 0.088 |
| D | 12 | Ex. | 0.590 | 0.75 | 2.75 | 0.001 | 0.013 | 0.001 | 0.005 | 1.533 | 0.0009 | 0.030 | 0.026 | 0.17 | 0.19 | 2.55 | 0.865 | 0.088 |
| E | 13 | Ex. | 0.155 | 0.99 | 6.98 | 0.007 | 0.003 | 0.000 | 0.001 | 0.824 | 0.0073 | 0.146 | 0.030 | 0.02 | 0.82 | 0.30 | 0.079 | 0.730 |
| E | 14 | Ex. | 0.157 | 1.00 | 6.84 | 0.007 | 0.003 | 0.000 | 0.001 | 0.817 | 0.0073 | 0.148 | 0.030 | 0.02 | 0.82 | 0.30 | 0.079 | 0.730 |
| E | 15 | Ex. | 0.157 | 1.00 | 6.85 | 0.007 | 0.003 | 0.000 | 0.001 | 0.832 | 0.0073 | 0.148 | 0.030 | 0.02 | 0.82 | 0.30 | 0.079 | 0.730 |
| F | 16 | Ex. | 0.295 | 0.05 | 1.17 | 0.001 | 0.002 | 0.001 | 0.019 | 0.822 | 0.0055 | 0.041 | 0.030 | 0.03 | 0.09 | 0.77 | 0.094 | 0.097 |
| F | 17 | Ex. | 0.297 | 0.05 | 1.16 | 0.001 | 0.002 | 0.001 | 0.019 | 0.834 | 0.0055 | 0.041 | 0.030 | 0.03 | 0.09 | 0.77 | 0.094 | 0.097 |
| F | 18 | Ex. | 0.300 | 0.05 | 1.15 | 0.001 | 0.002 | 0.001 | 0.019 | 0.826 | 0.0055 | 0.040 | 0.030 | 0.03 | 0.09 | 0.77 | 0.094 | 0.097 |
| G | 19 | Ex. | 0.174 | 0.19 | 3.16 | 0.001 | 0.003 | 0.001 | 0.001 | 0.769 | 0.0009 | 0.026 | 0.026 | 0.02 | 0.08 | 0.34 | 0.066 | 0.066 |
| G | 20 | Ex. | 0.175 | 0.19 | 3.16 | 0.001 | 0.003 | 0.001 | 0.001 | 0.766 | 0.0009 | 0.026 | 0.026 | 0.02 | 0.08 | 0.34 | 0.066 | 0.066 |
| G | 21 | Ex. | 0.173 | 0.19 | 3.11 | 0.001 | 0.003 | 0.001 | 0.001 | 0.778 | 0.0009 | 0.026 | 0.026 | 0.02 | 0.08 | 0.34 | 0.066 | 0.066 |
| H | 22 | Ex. | 0.647 | 1.09 | 2.58 | 0.003 | 0.002 | 0.009 | 0.001 | 0.663 | 0.0007 | 0.023 | 0.060 | 0.03 | 0.54 | 1.61 | 0.531 | 0.067 |
| H | 23 | Ex. | 0.647 | 1.11 | 2.54 | 0.003 | 0.002 | 0.009 | 0.001 | 0.667 | 0.0007 | 0.023 | 0.060 | 0.03 | 0.54 | 1.61 | 0.531 | 0.067 |
| H | 24 | Ex. | 0.646 | 1.11 | 2.53 | 0.003 | 0.002 | 0.009 | 0.001 | 0.667 | 0.0007 | 0.023 | 0.060 | 0.03 | 0.54 | 1.61 | 0.531 | 0.067 |
| I | 25 | Ex. | 0.197 | 1.13 | 0.98 | 0.001 | 0.008 | 0.002 | 0.006 | 0.711 | 0.0006 | 0.033 | 0.023 | 0.02 | 0.10 | 0.14 | 0.069 | 0.111 |
| I | 26 | Ex. | 0.195 | 1.13 | 0.98 | 0.001 | 0.008 | 0.002 | 0.005 | 0.712 | 0.0006 | 0.034 | 0.023 | 0.02 | 0.10 | 0.14 | 0.069 | 0.111 |

TABLE 4-2

| Steel type | No. | Classification | \multicolumn{16}{c}{Composition at thickness 1/4 position (mass %)} |
|---|---|---|---|---|---|---|---|---|---|---|---|---|---|---|---|---|---|---|
| | | | C | Si | Mn | P | S | N | O | Al | B | Ti | Nb | V | Mo | Cr | Ni | Cu |
| I | 27 | Ex. | 0.198 | 1.13 | 0.99 | 0.001 | 0.008 | 0.002 | 0.006 | 0.723 | 0.0006 | 0.034 | 0.023 | 0.02 | 0.10 | 0.14 | 0.069 | 0.111 |
| I | 28 | Ex. | 0.198 | 1.15 | 0.98 | 0.001 | 0.008 | 0.002 | 0.006 | 0.711 | 0.0006 | 0.033 | 0.023 | 0.02 | 0.10 | 0.14 | 0.069 | 0.111 |
| J | 29 | Ex. | 0.225 | 0.90 | 2.37 | 0.009 | 0.042 | 0.001 | 0.001 | 0.907 | 0.0086 | 0.020 | 0.021 | 0.11 | 0.10 | 0.28 | 0.156 | 0.146 |
| J | 30 | Ex. | 0.227 | 0.90 | 2.36 | 0.009 | 0.042 | 0.001 | 0.001 | 0.897 | 0.0086 | 0.020 | 0.021 | 0.11 | 0.10 | 0.28 | 0.156 | 0.146 |
| J | 31 | Ex. | 0.226 | 0.89 | 2.36 | 0.009 | 0.042 | 0.001 | 0.001 | 0.913 | 0.0086 | 0.020 | 0.021 | 0.11 | 0.10 | 0.28 | 0.156 | 0.146 |
| K | 32 | Ex. | 0.128 | 0.37 | 0.91 | 0.001 | 0.037 | 0.005 | 0.002 | 0.592 | 0.0030 | 0.170 | 0.022 | 0.06 | 0.12 | 0.22 | 0.284 | 0.089 |
| K | 33 | Ex. | 0.127 | 0.38 | 0.91 | 0.001 | 0.037 | 0.005 | 0.002 | 0.593 | 0.0030 | 0.167 | 0.022 | 0.06 | 0.12 | 0.22 | 0.284 | 0.089 |
| K | 34 | Ex. | 0.128 | 0.37 | 0.91 | 0.001 | 0.037 | 0.005 | 0.002 | 0.599 | 0.0030 | 0.167 | 0.022 | 0.06 | 0.12 | 0.22 | 0.284 | 0.089 |
| L | 35 | Ex. | 0.208 | 0.29 | 6.76 | 0.001 | 0.004 | 0.001 | 0.005 | 2.329 | 0.0009 | 0.103 | 0.026 | 0.15 | 0.26 | 0.16 | 0.049 | 0.093 |
| L | 36 | Ex. | 0.208 | 0.29 | 6.78 | 0.001 | 0.004 | 0.001 | 0.005 | 2.291 | 0.0009 | 0.103 | 0.026 | 0.15 | 0.26 | 0.16 | 0.049 | 0.093 |
| L | 37 | Ex. | 0.208 | 0.29 | 6.74 | 0.001 | 0.004 | 0.001 | 0.005 | 2.284 | 0.0009 | 0.103 | 0.026 | 0.15 | 0.26 | 0.16 | 0.049 | 0.093 |
| L | 38 | Ex. | 0.208 | 0.28 | 6.77 | 0.001 | 0.004 | 0.001 | 0.005 | 2.285 | 0.0009 | 0.104 | 0.026 | 0.15 | 0.26 | 0.16 | 0.049 | 0.093 |
| M | 39 | Ex. | 0.170 | 0.81 | 1.88 | 0.005 | 0.004 | 0.008 | 0.001 | 0.679 | 0.0008 | 0.029 | 0.029 | 0.03 | 0.74 | 0.53 | 0.084 | 0.076 |
| M | 40 | Ex. | 0.171 | 0.82 | 1.86 | 0.005 | 0.004 | 0.008 | 0.001 | 0.688 | 0.0008 | 0.029 | 0.029 | 0.03 | 0.74 | 0.53 | 0.084 | 0.076 |
| M | 41 | Ex. | 0.168 | 0.82 | 1.86 | 0.005 | 0.004 | 0.008 | 0.001 | 0.684 | 0.0008 | 0.028 | 0.029 | 0.03 | 0.74 | 0.53 | 0.084 | 0.076 |
| N | 42 | Ex. | 0.291 | 0.80 | 2.16 | 0.001 | 0.026 | 0.001 | 0.003 | 1.149 | 0.0008 | 0.019 | 0.151 | 0.03 | 0.12 | 0.41 | 0.115 | 0.068 |
| N | 43 | Ex. | 0.290 | 0.79 | 2.16 | 0.001 | 0.026 | 0.001 | 0.003 | 1.149 | 0.0008 | 0.019 | 0.151 | 0.03 | 0.12 | 0.41 | 0.115 | 0.068 |
| N | 44 | Ex. | 0.287 | 0.79 | 2.16 | 0.001 | 0.026 | 0.001 | 0.003 | 1.135 | 0.0008 | 0.019 | 0.151 | 0.03 | 0.12 | 0.41 | 0.115 | 0.068 |
| N | 45 | Ex. | 0.287 | 0.79 | 2.19 | 0.001 | 0.026 | 0.001 | 0.003 | 1.128 | 0.0008 | 0.019 | 0.151 | 0.03 | 0.12 | 0.41 | 0.115 | 0.068 |
| O | 46 | Ex. | 0.130 | 1.06 | 2.26 | 0.001 | 0.003 | 0.001 | 0.003 | 0.826 | 0.0009 | 0.065 | 0.116 | 0.02 | 0.08 | 0.32 | 0.105 | 0.165 |
| O | 47 | Ex. | 0.130 | 1.08 | 2.23 | 0.001 | 0.003 | 0.001 | 0.004 | 0.831 | 0.0009 | 0.065 | 0.116 | 0.02 | 0.08 | 0.32 | 0.105 | 0.165 |
| O | 48 | Ex. | 0.131 | 1.06 | 2.23 | 0.001 | 0.003 | 0.001 | 0.004 | 0.822 | 0.0009 | 0.065 | 0.116 | 0.02 | 0.08 | 0.32 | 0.105 | 0.165 |
| O | 49 | Ex. | 0.131 | 1.08 | 2.24 | 0.001 | 0.003 | 0.001 | 0.004 | 0.828 | 0.0009 | 0.065 | 0.116 | 0.02 | 0.08 | 0.32 | 0.105 | 0.165 |
| A | 50 | Comp. ex. | 0.102 | 0.85 | 1.32 | 0.001 | 0.005 | 0.001 | 0.010 | 0.672 | 0.0019 | 0.032 | 0.043 | 0.03 | 0.07 | 0.24 | 0.208 | 0.536 |
| A | 51 | Comp. ex. | 0.104 | 0.85 | 1.31 | 0.001 | 0.005 | 0.001 | 0.010 | 0.671 | 0.0019 | 0.033 | 0.043 | 0.03 | 0.07 | 0.24 | 0.208 | 0.536 |
| B | 52 | Comp. ex. | 0.382 | 0.63 | 1.00 | 0.001 | 0.004 | 0.003 | 0.001 | 0.627 | 0.0015 | 0.025 | 0.022 | 0.05 | 0.10 | 0.32 | 0.772 | 0.291 |

TABLE 4-3

| Steel type | No. | Classification | \multicolumn{16}{c}{Composition at thickness 1/4 position (mass %)} |
|---|---|---|---|---|---|---|---|---|---|---|---|---|---|---|---|---|---|---|
| | | | C | Si | Mn | P | S | N | O | Al | B | Ti | Nb | V | Mo | Cr | Ni | Cu |
| B | 53 | Comp. ex. | 0.399 | 0.69 | 1.06 | 0.001 | 0.004 | 0.003 | 0.001 | 0.689 | 0.0015 | 0.026 | 0.022 | 0.05 | 0.10 | 0.32 | 0.772 | 0.291 |
| C | 54 | Comp. ex. | 0.671 | 0.11 | 0.90 | 0.002 | 0.010 | 0.001 | 0.018 | 0.641 | 0.0008 | 0.030 | 0.172 | 0.04 | 0.07 | 1.14 | 0.096 | 0.849 |
| E | 55 | Comp. ex. | 0.155 | 1.00 | 6.97 | 0.007 | 0.003 | 0.000 | 0.001 | 0.824 | 0.0073 | 0.147 | 0.030 | 0.02 | 0.82 | 0.30 | 0.079 | 0.730 |
| N | 56 | Ex. | 0.292 | 0.79 | 2.16 | 0.001 | 0.026 | 0.001 | 0.003 | 1.142 | 0.0008 | 0.019 | 0.151 | 0.03 | 0.12 | 0.41 | 0.115 | 0.068 |
| P | 57 | Comp. ex. | 0.034 | 0.31 | 6.55 | 0.009 | 0.006 | 0.001 | 0.014 | 1.913 | 0.0011 | 0.037 | 0.044 | 0.04 | 0.66 | 0.12 | 0.121 | 0.816 |
| Q | 58 | Comp. ex. | 0.809 | 1.04 | 2.15 | 0.001 | 0.003 | 0.001 | 0.001 | 0.713 | 0.0010 | 0.024 | 0.029 | 0.06 | 0.74 | 0.28 | 0.074 | 0.098 |
| G | 59 | Comp. ex. | 0.171 | 0.19 | 3.03 | 0.001 | 0.003 | 0.001 | 0.001 | 0.738 | 0.0009 | 0.026 | 0.026 | 0.02 | 0.08 | 0.34 | 0.065 | 0.065 |
| H | 60 | Comp. ex. | 0.648 | 1.07 | 2.43 | 0.003 | 0.002 | 0.009 | 0.001 | 0.648 | 0.0007 | 0.023 | 0.059 | 0.03 | 0.53 | 1.59 | 0.523 | 0.066 |
| I | 61 | Comp. ex. | 0.197 | 1.12 | 0.97 | 0.001 | 0.008 | 0.002 | 0.006 | 0.710 | 0.0006 | 0.034 | 0.023 | 0.02 | 0.10 | 0.14 | 0.068 | 0.110 |
| R | 62 | Ex. | 0.301 | 0.38 | 2.64 | 0.011 | 0.003 | 0.001 | 0.010 | 0.036 | — | — | — | — | 0.12 | 0.35 | — | — |
| S | 63 | Ex. | 0.164 | 0.82 | 2.14 | 0.006 | 0.003 | 0.002 | 0.001 | 0.013 | 0.0018 | 0.024 | — | — | — | — | — | — |
| T | 64 | Ex. | 0.229 | 0.92 | 2.42 | 0.051 | 0.004 | 0.003 | 0.003 | 0.516 | — | 0.006 | 0.005 | 0.01 | — | — | — | — |
| U | 65 | Ex. | 0.268 | 0.80 | 2.64 | 0.009 | 0.042 | 0.001 | 0.004 | 0.699 | — | — | — | — | — | — | — | — |
| V | 66 | Ex. | 0.298 | 1.13 | 2.05 | 0.001 | 0.008 | 0.002 | 0.001 | 0.414 | — | — | — | — | — | — | — | — |
| A | 67 | Comp. ex. | 0.102 | 0.86 | 1.31 | 0.001 | 0.005 | 0.001 | 0.010 | 0.668 | 0.0019 | 0.033 | 0.043 | 0.03 | 0.07 | 0.24 | 0.208 | 0.536 |
| B | 68 | Comp. ex. | 0.398 | 0.70 | 1.05 | 0.001 | 0.004 | 0.003 | 0.001 | 0.691 | 0.0015 | 0.026 | 0.022 | 0.05 | 0.10 | 0.32 | 0.772 | 0.291 |
| C | 69 | Comp. ex. | 0.669 | 0.11 | 0.90 | 0.002 | 0.010 | 0.001 | 0.018 | 0.641 | 0.0008 | 0.030 | 0.172 | 0.04 | 0.07 | 1.14 | 0.096 | 0.849 |
| L | 70 | Comp. ex. | 0.208 | 0.28 | 6.77 | 0.001 | 0.004 | 0.001 | 0.005 | 2.285 | 0.0009 | 0.104 | 0.026 | 0.15 | 0.26 | 0.16 | 0.049 | 0.093 |
| M | 71 | Comp. ex. | 0.171 | 0.82 | 1.86 | 0.005 | 0.004 | 0.008 | 0.001 | 0.688 | 0.0008 | 0.029 | 0.029 | 0.03 | 0.74 | 0.53 | 0.084 | 0.076 |
| N | 72 | Comp. ex. | 0.291 | 0.80 | 2.16 | 0.001 | 0.026 | 0.001 | 0.003 | 1.149 | 0.0008 | 0.019 | 0.151 | 0.03 | 0.12 | 0.41 | 0.115 | 0.068 |
| O | 73 | Comp. ex. | 0.130 | 1.06 | 2.26 | 0.001 | 0.003 | 0.001 | 0.003 | 0.826 | 0.0009 | 0.065 | 0.116 | 0.02 | 0.08 | 0.32 | 0.105 | 0.165 |
| S | 74 | Comp. ex. | 0.164 | 0.82 | 2.14 | 0.006 | 0.003 | 0.002 | 0.001 | 0.013 | 0.0018 | 0.024 | — | — | — | — | — | — |
| T | 75 | Comp. ex. | 0.229 | 0.92 | 2.42 | 0.051 | 0.004 | 0.003 | 0.003 | 0.516 | — | 0.006 | 0.005 | 0.01 | — | — | — | — |
| U | 76 | Comp. ex. | 0.268 | 0.80 | 2.64 | 0.009 | 0.042 | 0.001 | 0.004 | 0.699 | — | — | — | — | — | — | — | — |
| V | 77 | Comp. ex. | 0.298 | 1.13 | 2.05 | 0.001 | 0.008 | 0.002 | 0.001 | 0.414 | — | — | — | — | — | — | — | — |

TABLE 5-1

| Steel type | No. | Classification | Al oxides at surface layer part - Number density (/mm²) | Average | Standard error | Ratio deviated from average (%) | Number density of Al oxides at thickness 1/2 position (/mm²) | Tensile strength (MPa) | Total elongation (%) | Tensile × total elongation (MPa %) | Strength of welded joint (kN) | Retained austenite area fraction (%) | Sheet thickness (mm) | Position of surface layer part |
|---|---|---|---|---|---|---|---|---|---|---|---|---|---|---|
| A | 1 | Ex. | 4775 | -3.7 | 0.6 | 5 | 775 | 960 | 24 | 23040 | 6.3 | 15 | 2.2 | 2 sides |
| A | 2 | Ex. | 5775 | -3.5 | 0.6 | 5 | 525 | 880 | 27 | 23760 | 6.3 | 16 | 1.8 | 1 side |
| A | 3 | Ex. | 5175 | -4.4 | 0.3 | 5 | 725 | 920 | 27 | 24840 | 6.4 | 16 | 1.0 | 2 sides |
| B | 4 | Ex. | 5700 | -3.8 | 0.4 | 4 | 650 | 1750 | 9 | 15750 | 10.7 | — | 1.0 | 2 sides |
| B | 5 | Ex. | 4975 | -3.5 | 0.5 | 1 | 675 | 1770 | 6 | 10620 | 10.9 | — | 1.0 | 2 sides |
| B | 6 | Ex. | 5650 | -4.1 | 0.5 | 4 | 500 | 1460 | 11 | 16060 | 10.8 | — | 1.6 | 1 side |
| C | 7 | Ex. | 5400 | -3.5 | 0.6 | 4 | 600 | 2040 | 5 | 10200 | 13.5 | — | 0.8 | 2 sides |
| C | 8 | Ex. | 5500 | -4.0 | 0.4 | 3 | 500 | 1830 | 6 | 10980 | 13.4 | — | 1.2 | 2 sides |
| C | 9 | Ex. | 5250 | -3.6 | 0.6 | 4 | 525 | 2080 | 9 | 18720 | 13.5 | — | 2.2 | 2 sides |
| D | 10 | Ex. | 4450 | -4.1 | 0.6 | 5 | 500 | 1940 | 6 | 11640 | 12.7 | — | 2.0 | 2 sides |
| D | 11 | Ex. | 5350 | -3.5 | 0.5 | 4 | 900 | 1960 | 9 | 17640 | 13.0 | — | 2.2 | 1 side |
| D | 12 | Ex. | 5925 | -3.5 | 0.6 | 5 | 650 | 1990 | 9 | 17910 | 13.3 | — | 2.0 | 2 sides |
| E | 13 | Ex. | 5775 | -3.5 | 0.6 | 4 | 500 | 1110 | 20 | 22200 | 6.6 | 12 | 1.4 | 1 side |
| E | 14 | Ex. | 4675 | -4.2 | 0.3 | 2 | 500 | 1100 | 20 | 22000 | 7.1 | 12 | 1.6 | 2 sides |
| E | 15 | Ex. | 5125 | -3.5 | 0.6 | 1 | 750 | 1030 | 21 | 21630 | 6.7 | 14 | 2.2 | 2 sides |
| F | 16 | Ex. | 5400 | -3.5 | 0.6 | 1 | 525 | 1400 | 8 | 11200 | 8.3 | — | 1.8 | 2 sides |
| F | 17 | Ex. | 5550 | -3.6 | 0.6 | 5 | 500 | 1420 | 11 | 15620 | 9.0 | — | 1.0 | 2 sides |
| F | 18 | Ex. | 5475 | -4.6 | 0.5 | 3 | 975 | 1450 | 8 | 11600 | 8.4 | — | 2.4 | 2 sides |
| G | 19 | Ex. | 4450 | -4.1 | 0.6 | 1 | 575 | 1150 | 21 | 24150 | 7.1 | 11 | 2.4 | 2 sides |
| G | 20 | Ex. | 4675 | -3.5 | 0.4 | 4 | 500 | 1190 | 21 | 24990 | 6.9 | 11 | 1.0 | 2 sides |
| G | 21 | Ex. | 5025 | -3.5 | 0.4 | 5 | 525 | 1270 | 8 | 10160 | 6.8 | — | 1.4 | 2 sides |
| H | 22 | Ex. | 5125 | -4.2 | 0.5 | 1 | 775 | 1820 | 10 | 18200 | 13.4 | — | 2.0 | 1 side |
| H | 23 | Ex. | 5650 | -4.7 | 0.4 | 4 | 500 | 1750 | 6 | 10500 | 13.1 | — | 2.2 | 2 sides |
| H | 24 | Ex. | 5750 | -3.7 | 0.5 | 5 | 500 | 2020 | 6 | 12120 | 13.5 | — | 1.4 | 2 sides |
| I | 25 | Ex. | 4975 | -3.5 | 0.5 | 1 | 900 | 1050 | 22 | 23100 | 6.9 | 13 | 2.4 | 2 sides |
| I | 26 | Ex. | 4675 | -4.1 | 0.5 | 4 | 850 | 1080 | 19 | 20520 | 6.9 | 12 | 2.4 | 1 side |

TABLE 5-2

| Steel type | No. | Classification | Al oxides at surface layer part - Number density (/mm²) | Average | Standard error | Ratio deviated from average (%) | Number density of Al oxides at thickness 1/2 position (/mm²) | Tensile strength (MPa) | Total elongation (%) | Tensile × total elongation (MPa %) | Strength of welded joint (kN) | Retained austenite area fraction (%) | Sheet thickness (mm) | Position of surface layer part |
|---|---|---|---|---|---|---|---|---|---|---|---|---|---|---|
| I | 27 | Ex. | 5100 | -3.9 | 0.6 | 4 | 875 | 1140 | 21 | 23940 | 7.0 | 11 | 2.2 | 2 sides |
| I | 28 | Ex. | 4825 | -4.3 | 0.6 | 5 | 700 | 1020 | 21 | 21420 | 7.1 | 14 | 1.6 | 2 sides |
| J | 29 | Ex. | 5850 | -3.9 | 0.4 | 4 | 500 | 1170 | 18 | 21060 | 8.0 | 11 | 1.4 | 2 sides |
| J | 30 | Ex. | 5350 | -3.5 | 0.5 | 3 | 500 | 1260 | 12 | 15120 | 8.1 | — | 2.4 | 2 sides |
| J | 31 | Ex. | 5350 | -3.7 | 0.5 | 4 | 725 | 1110 | 19 | 21090 | 7.7 | 12 | 1.4 | 2 sides |
| K | 32 | Ex. | 4975 | -3.7 | 0.6 | 1 | 625 | 790 | 26 | 20540 | 6.8 | 12 | 2.0 | 2 sides |
| K | 33 | Ex. | 4950 | -4.7 | 0.3 | 4 | 500 | 800 | 27 | 21600 | 6.8 | 18 | 0.8 | 2 sides |
| K | 34 | Ex. | 5175 | -4.2 | 0.4 | 2 | 500 | 800 | 33 | 26400 | 6.6 | 18 | 1.6 | 2 sides |
| L | 35 | Ex. | 5650 | -3.6 | 0.5 | 5 | 500 | 930 | 29 | 26970 | 7.7 | 15 | 1.2 | 2 sides |
| L | 36 | Ex. | 5625 | -3.8 | 0.5 | 1 | 500 | 880 | 30 | 26400 | 7.7 | 16 | 2.2 | 2 sides |
| L | 37 | Ex. | 5500 | -3.5 | 0.6 | 3 | 700 | 890 | 30 | 26700 | 7.7 | 16 | 0.8 | 2 sides |
| L | 38 | Ex. | 5325 | -4.4 | 0.5 | 2 | 775 | 940 | 24 | 22560 | 7.8 | 15 | 1.0 | 2 sides |
| M | 39 | Ex. | 5325 | -3.7 | 0.6 | 1 | 650 | 970 | 28 | 27160 | 7.0 | 15 | 1.8 | 2 sides |
| M | 40 | Ex. | 3925 | -4.4 | 0.5 | 4 | 625 | 1090 | 20 | 21800 | 6.9 | 13 | 1.4 | 2 sides |
| M | 41 | Ex. | 5625 | -3.5 | 0.6 | 4 | 625 | 990 | 24 | 23760 | 7.3 | 14 | 1.6 | 2 sides |
| N | 42 | Ex. | 5100 | -3.8 | 0.6 | 5 | 800 | 1380 | 8 | 11040 | 8.8 | — | 0.8 | 2 sides |
| N | 43 | Ex. | 5925 | -3.5 | 0.6 | 3 | 500 | 1300 | 12 | 15600 | 8.9 | — | 2.0 | 2 sides |
| N | 44 | Ex. | 4075 | -4.5 | 0.4 | 4 | 925 | 1340 | 9 | 12060 | 8.8 | — | 1.2 | 1 side |
| N | 45 | Ex. | 5900 | -3.9 | 0.2 | 5 | 500 | 1440 | 12 | 17280 | 8.2 | — | 1.6 | 2 sides |
| O | 46 | Ex. | 5250 | -4.3 | 0.4 | 1 | 600 | 960 | 23 | 22080 | 6.4 | 15 | 1.8 | 2 sides |
| O | 47 | Ex. | 4950 | -3.5 | 0.5 | 5 | 550 | 960 | 21 | 20160 | 6.5 | 15 | 1.4 | 2 sides |
| O | 48 | Ex. | 5850 | -3.7 | 0.5 | 5 | 500 | 1060 | 22 | 23320 | 6.6 | 13 | 1.8 | 1 side |
| O | 49 | Ex. | 4325 | -4.5 | 0.2 | 1 | 500 | 980 | 26 | 25480 | 6.6 | 15 | 1.0 | 2 sides |
| A | 50 | Comp. ex. | 2550 | -5.2 | 0.2 | 4 | 675 | 930 | 25 | 23250 | 5.9 | 15 | 1.2 | 1 side |
| A | 51 | Comp. ex. | 2225 | -4.0 | 0.6 | 5 | 525 | 930 | 24 | 22320 | 5.9 | 16 | 2.2 | 2 sides |
| B | 52 | Comp. ex. | 2775 | -4.0 | 0.4 | 4 | 1100 | 1480 | 6 | 8880 | 4.8 | — | 1.6 | 1 side |

TABLE 5-3

| | | | Al oxides at surface layer part | | | Number density of Al oxides at thickness 1/2 position (/mm²) | Mechanical properties | | | Fractions of structures | | |
|---|---|---|---|---|---|---|---|---|---|---|---|---|---|
| Steel type | No. | Classifi-cation | Number density (/mm²) | Average | Standard error | Ratio deviated from average (%) | | Tensile strength (MPa) | Total elongation (%) | Tensile × total elongation (MPa %) | Strength of welded joint (kN) | Retained austenite area fraction (%) | Sheet thickness (mm) | Position of surface layer part |
| B | 53 | Comp. ex. | 1875 | −3.6 | 0.6 | 3 | 600 | 1680 | 9 | 15120 | 4.2 | — | 1.8 | 2 sides |
| C | 54 | Comp. ex. | 2100 | −4.0 | 0.5 | 5 | 550 | 2060 | 8 | 16480 | 2.6 | — | 2.0 | 1 side |
| E | 55 | Comp. ex. | 5325 | −3.9 | 0.6 | 5 | 950 | 690 | 19 | 13110 | 6.7 | 13 | 1.2 | 2 sides |
| N | 56 | Ex. | 5775 | −4.2 | 0.3 | 5 | 500 | 1530 | 14 | 21420 | 8.9 | 7 | 1.2 | 2 sides |
| P | 57 | Comp. ex. | 5050 | −4.3 | 0.5 | 2 | 625 | 570 | 36 | 20520 | 6.3 | 19 | 1.0 | 1 side |
| Q | 58 | Comp. ex. | 5275 | −3.8 | 0.6 | 5 | 675 | 1990 | 5 | 9950 | 14.0 | — | 2.4 | 2 sides |
| G | 59 | Comp. ex. | 4700 | −5.1 | 0.4 | 2 | 500 | 660 | 23 | 15180 | 6.6 | 1 | 1.0 | 2 sides |
| H | 60 | Comp. ex. | 5775 | −3.7 | 0.5 | 1 | 650 | 760 | 7 | 5320 | 8.9 | 1 | 1.6 | 1 side |
| I | 61 | Comp. ex. | 5575 | −4.0 | 0.3 | 2 | 525 | 590 | 13 | 7670 | 7.7 | 2 | 0.8 | 2 sides |
| R | 62 | Ex. | 3875 | −3.7 | 0.6 | 4 | 500 | 1280 | 17 | 21760 | 6.4 | 11 | 1.6 | 2 sides |
| S | 63 | Ex. | 5575 | −3.6 | 0.6 | 3 | 700 | 1010 | 15 | 15150 | 6.5 | — | 1.2 | 2 sides |
| T | 64 | Ex. | 5175 | −4.2 | 0.4 | 1 | 500 | 990 | 23 | 22770 | 6.6 | 17 | 1.4 | 2 sides |
| U | 65 | Ex. | 5475 | −3.6 | 0.5 | 3 | 775 | 1020 | 21 | 21420 | 6.6 | 14 | 1.2 | 2 sides |
| V | 66 | Ex. | 3675 | −3.5 | 0.6 | 2 | 525 | 1420 | 8 | 11360 | 7.9 | — | 1.4 | 2 sides |
| A | 67 | Comp. ex. | 6375 | −3.3 | 0.7 | 4 | 525 | 990 | 10 | 9900 | 5.6 | 14 | 0.8 | 2 sides |
| B | 68 | Comp. ex. | 6625 | −2.9 | 0.6 | 2 | 600 | 1470 | 6 | 8820 | 4.5 | — | 2.0 | 2 sides |
| C | 69 | Comp. ex. | 6850 | −3.2 | 0.6 | 3 | 475 | 2210 | 3 | 6630 | 3.5 | — | 1.0 | 2 sides |
| L | 70 | Comp. ex. | 6475 | −3.2 | 0.7 | 3 | 575 | 1240 | 8 | 9920 | 5.5 | — | 3.2 | 2 sides |
| M | 71 | Comp. ex. | 2075 | −4.9 | 0.3 | 4 | 675 | 1070 | 12 | 12840 | 5.8 | — | 3.0 | 1 side |
| N | 72 | Comp. ex. | 2750 | −3.9 | 0.3 | 4 | 1100 | 1320 | 7 | 9240 | 4.9 | — | 3.0 | 2 sides |
| O | 73 | Comp. ex. | 2525 | −4.1 | 0.6 | 5 | 525 | 1000 | 16 | 16000 | 5.7 | — | 3.6 | 2 sides |
| S | 74 | Comp. ex. | 1925 | −3.6 | 0.7 | 3 | 600 | 1000 | 15 | 15000 | 4.4 | — | 3.4 | 2 sides |
| T | 75 | Comp. ex. | 6575 | −2.8 | 0.5 | 2 | 600 | 1010 | 9 | 9090 | 4.3 | — | 2.8 | 2 sides |
| U | 76 | Comp. ex. | 2200 | −3.8 | 0.6 | 5 | 550 | 1250 | 13 | 16250 | 3.1 | — | 3.2 | 2 sides |
| V | 77 | Comp. ex. | 6575 | −3.3 | 0.6 | 3 | 475 | 1490 | 4 | 5960 | 3.8 | — | 3.0 | 2 sides |

In the above way, it was confirmed that, according to the present invention, steel sheet able to realize both formability and weldability by modification of the surface layer part is obtained.

On the other hand, in the steel sheets of Comparative Examples 50 and 71, the diameters of the wires added in the continuous casting process are smaller than 1 mm and the number densities of the Al oxides at the surface layer parts fall below 3000/mm². As a result, strength of the welded joints were 6.0 kN or less.

In the steel sheets of Comparative Examples 51 and 73, the distances between the center positions of the wires added in the continuous casting process and the surface of the molten steel are smaller than the wire diameter and the number densities of the Al oxides at the surface layer parts fall below 3000/mm². As a result, strength of the welded joints were 6.0 kN or less.

In the steel sheets of Comparative Examples 52 and 72, the distances between the center positions of the wires added in the continuous casting process and the surface of the molten steel are larger than the wire diameter+30 mm, so the number densities of the Al oxides at the surface layer parts fall below 3000/mm² and the number densities of the Al oxides at the positions of ½ of the thicknesses of the steel sheets rise above 1000/mm². As a result, the tensile strength×total elongation's were less than 10000 MPa % and strength of the welded joints were 6.0 kN or less.

In the steel sheets of Comparative Examples 53 and 74, the distances between the wires added in the continuous casting process are larger than the wire diameter+30 mm and the number densities of the Al oxides at the surface layer parts are smaller than 3000/mm². As a result, while the tensile strength×total elongation's were 10000 MPa % or more, strength of the welded joints were 6.0 kN or less.

In the steel sheets of Comparative Examples 54 and 76, the differences between the feed rates of the wires added in the continuous casting process and the flow rates of molten steel are larger than 500 mm/min and the number densities of the Al oxides at the surface layer parts are smaller than 3000/mm². As a result, while the tensile strength×total elongation's were 10000 MPa % or more, strength of the welded joints were 6.0 kN or less.

In the steel sheets of Comparative Examples 55 and 61, the average cooling rates from 750° C. to 550° C. in the hot rolling process or the annealing process are smaller than 2.5° C./s. As a result, in these steel sheets, the tensile strengths were lower than 780 MPa.

In the steel sheets of Comparative Examples 57 and 58, the concentrations of C do not satisfy the requirement of the present embodiment. As a result, in these steel sheets, the requirements of the tensile strength and the tensile strength× total elongation are not satisfied.

In the steel sheet of Comparative Example 59, the heating temperature in the annealing process is lower than the Ac3 point−50° C., so the tensile strength is lower than 780 MPa.

In the steel sheet of Comparative Example 60, the heating and holding time in the annealing process is shorter than 5 seconds, so the tensile strength is lower than 780 MPa and the tensile strength×total elongation is less than 10000 MPa %.

In the steel sheets of Comparative Examples 67 and 70, the diameters of the wires added in the continuous casting process are larger than 50 mm, the number densities of the Al oxides at the surface layer parts are higher than 6000/mm², and the averages of the logarithmic values of the particle sizes are larger than −3.5. As a result, in the steel sheets of the comparative examples, the tensile strength× total elongation's were less than 10000 MPa % and strength of the welded joints were 6.0 kN or less.

In the steel sheets of Comparative Examples 68 and 75, the distances between the wires added in the continuous casting process are smaller than the wire diameters, the number densities of the Al oxides at the surface layer parts are larger than 6000/mm$^2$, and the averages of the logarithmic values of the particle sizes are larger than −3.5. As a result, the tensile strength×total elongation's were less than 10000 MPa % and strength of the welded joints were 6.0 kN or less.

In the steel sheets of Comparative Examples 69 and 77, the differences between the feed rates of the wires added in the continuous casting process and the flow rates of molten steel are smaller than −500 mm/min and the number densities of the Al oxides at the surface layer parts are larger than 6000/mm$^2$. As a result, the tensile strength×total elongation's were less than 10000 MPa % and strength of the welded joints were 6.0 kN or less.

INDUSTRIAL APPLICABILITY

According to the present invention, it is possible to provide steel sheet excellent in formability and weldability. Such steel sheet of the present invention is suitable, for example, for a structural material in the field of automobiles and other transport machinery.

REFERENCE SIGNS LIST 1 molten steel
2 wire
11 tundish
12 continuous casting machine

The invention claimed is:

1. A steel sheet with a tensile strength of 780 MPa or more,
a region down to 30 μm from a surface of the steel sheet in a sheet thickness direction being defined as a "surface layer part",
at the surface layer part of at least one side,
particle size 20 nm or more Al oxide grains being present in 3000 to 6000/mm$^2$ in number density,
an average of natural logarithms of the particle sizes of the Al oxide grains measured in μm units being −5.0 to −3.5,
a standard error of the natural logarithms of the particle sizes being 0.8 or less,
a number of Al oxide grains with deviations of the natural logarithms of the particle sizes from the average of larger than 2 times the standard error being 5% or less of the total number of Al oxide grains,
a chemical composition at a position of ¼ of the thickness from the surface of the steel sheet comprising, by mass %,
C: 0.050 to 0.800%,
Si: 0.01 to 1.20%,
Mn: 0.01 to 8.00%,
P: 0.100% or less,
S: 0.050% or less,
Al: 0 to 3.000%,
N: 0.010% or less,
O: 0 to 0.020%,
Cr: 0 to 3.00%,
Mo: 0 to 1.00%,
B: 0 to 0.0100%,
Ti: 0 to 0.200%,
Nb: 0 to 0.200%,
V: 0 to 0.20%,
Cu: 0 to 1.000%,
Ni: 0 to 1.000%, and
bal.: Fe and impurities,
a number density of Al oxide grains at a position of ½ of the thickness of the steel sheet being 1000/mm$^2$ or less.

2. The steel sheet according to claim 1, wherein the chemical composition further comprises at least one element of, by mass %,
Cr: 0.01 to 3.00%,
Mo: 0.01 to 1.00%,
B: 0.001 to 0.0100%,
Ti: 0.010 to 0.200%,
Nb: 0.010 to 0.200%,
V: 0.01 to 0.20%,
Cu: 0.010 to 1.000%, and
Ni: 0.010 to 1.000%.

3. The steel sheet according to claim 1 wherein metallic structures at a position of ¼ of the thickness from the surface of the steel sheet include, by area ratio, retained austenite in 10% or more.

4. The steel sheet according to claim 1, wherein the steel sheet further comprises a hot dip galvanized layer, a hot dip galvannealed layer, or an electrogalvanized layer at the surface of the surface layer part.

* * * * *